United States Patent [19]

Nagato et al.

[11] Patent Number: 4,897,668

[45] Date of Patent: Jan. 30, 1990

[54] APPARATUS FOR TRANSFERRING INK FROM INK RIBBON TO A RECORDING MEDIUM BY APPLYING HEAT TO THE MEDIUM, THEREBY RECORDING DATA ON THE MEDIUM

[75] Inventors: Hitoshi Nagato; Tadayoshi Ohno, Kawasaki; Tsutomu Kanai, Yokohama; Akito Iwamoto, Kamakura, all of Japan

[73] Assignee: Kabushiki Kaisha Toshiba, Kawasaki, Japan

[21] Appl. No.: 163,394

[22] Filed: Mar. 2, 1988

[30] Foreign Application Priority Data

| | | | |
|---|---|---|---|
| Mar. 2, 1987 | [JP] | Japan | 62-45150 |
| Jun. 2, 1987 | [JP] | Japan | 62-137675 |
| Jul. 27, 1987 | [JP] | Japan | 62-186981 |
| Jul. 29, 1987 | [JP] | Japan | 62-187630 |
| Jul. 30, 1987 | [JP] | Japan | 62-190868 |
| Jul. 30, 1987 | [JP] | Japan | 62-191409 |
| Jul. 31, 1987 | [JP] | Japan | 62-190366 |

[51] Int. Cl.[4] .............................. G01D 15/10

[52] U.S. Cl. .............................. 346/76 PH; 400/120

[58] Field of Search .............................. 346/76 PH; 400/120

[56] References Cited

U.S. PATENT DOCUMENTS

| | | | |
|---|---|---|---|
| 4,685,069 | 8/1987 | Inui et al. | 346/76 PH |
| 4,760,405 | 7/1984 | Nagira et al. | 346/76 PH |

*Primary Examiner*—B. A. Reynolds
*Assistant Examiner*—Huan Tran
*Attorney, Agent, or Firm*—Oblon, Spivak, McClelland, Maier & Neustadt

[57] ABSTRACT

In an electrothermal printing apparatus, ink ribbon is fed in a predetermined direction and is contacted with a recording electrode and a return electrode which is located upstream of the predetermined direction with respect to the recording electrode. A signal current is supplied from the recording electrode to a conductive layer of the ink ribbon through a resistive layer and the signal current supplied to the conductive layer is supplied to the return electrode through the resistive layer. Heat is generated at a portion of the ink ribbon, which is contacted with the recording electrode and is applied to the ink layer through the conductive layer, thereby printing an ink of the ink layer to a paper.

42 Claims, 26 Drawing Sheets

FIG. 35A
FIG. 35B
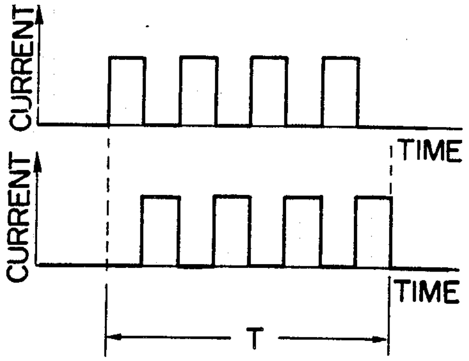
FIG. 36A
FIG. 36B
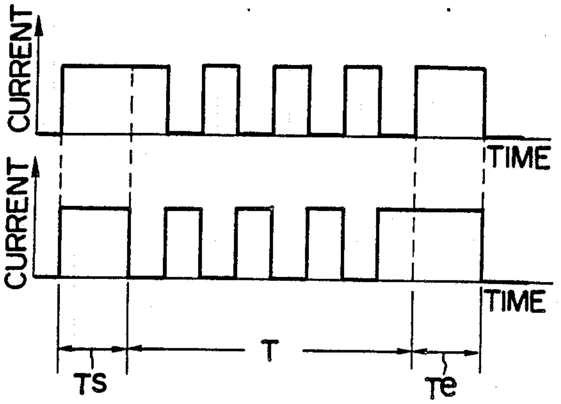
FIG. 37A
FIG. 37B
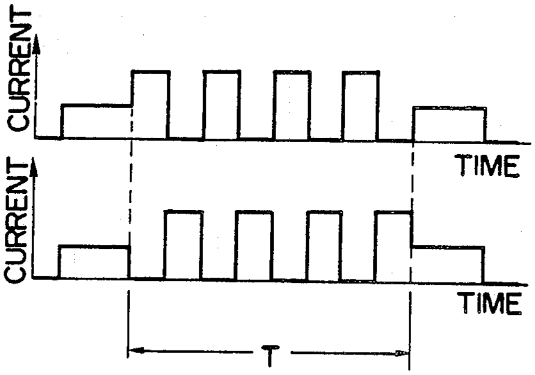

F I G. 38A
F I G. 38B
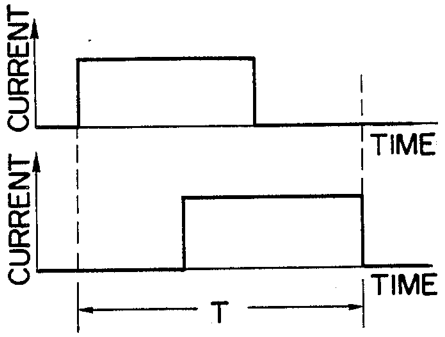
F I G. 39A
F I G. 39B
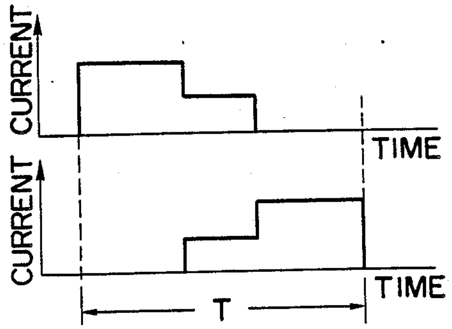
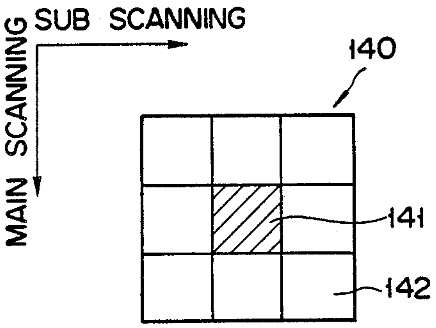
F I G. 40

APPARATUS FOR TRANSFERRING INK FROM INK RIBBON TO A RECORDING MEDIUM BY APPLYING HEAT TO THE MEDIUM, THEREBY RECORDING DATA ON THE MEDIUM

BACKGROUND OF THE INVENTION

1. Field of the Invention

This invention relates to an apparatus for transferring ink from an ink ribbon to a recording medium, by applying heat to the medium, thereby recording data on the recording medium, and more particularly, to a so-called "thermal recording printer."

2. Description of the Related Art

An apparatus, generally known as a "thermal recording printer", transfers ink from an ink ribbon to a recording medium, by heating the ink ribbon and thereby melting the ink. The printer can print data on sheets of ordinary paper, without making much noise, and can operate very reliably. For these advantages, the thermal recording printer is used as hard copy printers for use in various OA (Office Automation) apparatuses such as personal computers, word possessors, and color printers. The thermal recording printer is disadvantageous in two respects. First, the ink ribbon is liable to be cut during use. Secondly, the printer cannot print data in sufficient quality, on sheets of coarsely textured paper such as PPC paper or bond paper.

FIG. 1 is a schematic view showing an electrothermal printer of the known type. In this printer, use is made of ink ribbon 1 comprised of electrically resistive base film 2, electrically conductive layer 3 made of aluminum, and solid ink layer 4 coated on conductive layer 3. Ink layer 4 will melt, soften, or sublime when heated. Ink ribbon 1 is fed in the direction of arrow A by means of a ribbon-feeding mechanism (not shown).

As is shown in FIG. 1, the electrothermal printer comprises data-recording electrodes 5, signal-generating circuit 6, and return electrode 7. Electrodes 5 are pin-shaped and arranged parallel to one another. They can be moved in the direction of arrow C, and are electrically coupled with signal-generating circuit 6. Return electrode 7, which is moved along with electrode 5, is connected to the ground and located downstream of the ribbon-feeding direction (arrow A). Return electrode 7 is coupled to follow roller 8 by the ribbon-feeding mechanism. Follow roller 8 contacts ink ribbon 1; it is rotated as the mechanism feeds ink ribbon 1 in the direction of arrow A.

To print data on recording paper 9 located below ink ribbon 1, signal-generating circuit 6 supplies data signals to data-recording electrodes 5. Electrodes 5 supply ink ribbon 1 with the currents corresponding to the data signals. These currents (hereinafter referred to as "data currents") flows through resistive base film 2 into conductive layer 3, and flow from layer 3 to return electrode 7 through resistive base film 2, as is shown by arrow B. As the data currents flows from electrodes 5 through base film 2, Joule heat is generated in the limited portions of ink ribbon 1 which are located below electrodes 5. These portions of ribbon 1 are heated to 200° C. or more, whereby those portions of ink layer 4 which are on these portions of ribbon 1 are softened or melted. As a result, the ink is transferred from ribbon 1 onto recording paper 9.

As has been described above, the data currents also flow to return electrode 7 through resistive base film 2, and change into Joule heat. This heat is not sufficient to melt or soften solid ink layer 4, since that surface of return electrode 7 which contacts the ribbon 1 is much larger than that surface of each data-recording electrode 5 which contacts ribbon 1. Thus, return electrode 7 does not operate to transfer ink onto recording paper 9.

Data-recording electrodes 5 are moved, along with return electrode 7, in the direction of arrow C. While electrodes 5 are thus moved, they supply data currents to ink ribbon 1, in response to the data signals output from signal-generating circuit 6. Therefore, the ink is continuously transferred from ribbon 1 onto recording paper 9, whereby data, such as images and characters, are reproduced on recording paper 9.

As has been described, it is within ink ribbon 1 that heat is generated within ink ribbon 1 during the use of the thermal recording printer. Thus, the heat is fast transmitted to solid ink layer 4, and the printer can record data on paper at a speed higher than ordinary thermal printers having a thermal head which applies heat to an ink ribbon. Since heat is generated within ink ribbon 1, it is applied in its entirety to solid ink layer 4, thus heating layer 4 to a high temperature. Hence, solid ink layer 4 can be made of material having a high melting point or a high sublimation point.

Resistive ink ribbon 1 is made of three layers, and is more difficult to manufacture and, hence, more expensive than the ink ribbon for use in the ordinary thermal printers, which is comprised of two layers, i.e., an electrically resistive base film and a solid ink layer. Another drawback inherent in the resistive thermal printer is that each portion of ink ribbon 1 required for printing one line of characters cannot be shorter than the line of characters, and the running cost of the printer is, thus, relatively high.

A method is disclosed in U.S. Pat. No. 4,558,963 in which an ink ribbon is fed at low speed, in order to use the ink ribbon more efficiently in such a resistance thermal printer as is shown in FIG. 1, and thus to lower the running cost of the printer. Since the tape-feeding speed is low, the ink ribbon will likely be cut. Also, the low speed of feeding the ribbon results in the following problem.

As been explained, in the electrothermal printer shown in FIG. 1, the data currents applied to ink ribbon 1 change into Joule heat in those portions of solid ink layer 4 which are located below electrode 5. Since ribbon 1 is fed slowly, a great amount of heat is generated in these portions of ink layer 4. Those portions of conductive layer 3 and base film 2 which receive this heat are heated to 200° C. or more. As a result, the heated portions of layer 3 may be oxidized or cracked, and the heated portions of base film 2 may shrink. If this happens, all conductive layer 3 rendered almost non-conductive, except for both lateral edges which are not located under electrodes 5. The data currents flow concentratedly through the thin lateral edges of conductive layer 3 into that portion of base film 2 which contacts return electrode 7. When electrode 7 contacts any shrinked portion of resistive base film 2, which is narrower than unshrinked portions, a great amount of Joule heat is generated in the shrinked portion. This heat is transferred to the unshrinked portions of film 2, inevitably softening these portions and also the remaining portions of solid ink layer 4.

Consequently, ink ribbon 1 is cut at such a softened portion of base film 2, overcome by the tension which is applied on that portion of ribbon 1 which extends between data-recording electrodes 5, on the one hand, and return electrode 7, on the other. Moreover, ribbon 1 may be adhered to follow roller 8 by the remaining ink layer 4, now softened and thus viscous, and it may eventually taken up around roller 8. In the worst case, it may be cut at a shrinked portion of base film 2, which is positioned between roller 8 and electrodes 5.

The slower the ribbon is fed, thereby to use the ribbon efficiently, the greater the possibility that the ribbon is cut. Hence, it is practically impossible to apply the method disclosed in U.S. Pat. No. 4,558,963, wherein an ink ribbon is fed at low speed, to the resistance thermal printer having the structure shown in FIG. 1.

SUMMARY OF THE INVENTION

It is accordingly the object of the present invention to provide an electrothermal recording apparatus which can record data at high speed.

Furthermore, it is another object of the present invention to provide an electrothermal recording apparatus which can efficiently use ink ribbon, without cutting the ink ribbon during use.

During the use of the known electrothermal printers, the ink ribbon is often cut. The inventors hereof have conducted experiments on these printers, and have found that there are two causes of the cutting of the ribbon.

The first cause is the electrical resistance of conductive layer 3 of ink ribbon 1 (See FIG. 1). Since the resistance of conductive layer 3 is far lower than that of resistive base film 1, the currents applied from data-recording electrodes 5 to ribbon 1 flow through layer 3 to return electrode 7, as is represented by arrow B in FIG. 1. Conductive layer „ which is a thin aluminum layer (about 1 μm) vapor-deposited on base film 2, has a considerable resistance. Therefore, as the currents flow through layer 3 from electrodes 5 to return electrode 7, a voltage drop occurs; some part of these currents change into heat. Thus, the more electrodes 5 simultaneously supply currents to ink ribbon 1, or the greater current is supplied from each electrode 5 to record data at a higher speed, the greater heat will be generated in that portion of conductive layer 3 which extends between electrodes 5 and return electrode 7. Even though the heat generated in those portions of solid ink layer 4 which are located below data-recording electrodes 5 is dispersed within ribbon 1 as ribbon 1 is fed toward return electrode 7, the temperature of that portion of ribbon 1 which is reaching follow roller 8 is considerably high due to the heat generated in conductive layer 3. Consequently, solid ink layer 4 remaining on this portion of ribbon 1 is softened and viscous, and adheres ribbon 1 to roller 8, whereby ink ribbon 1 is taken up around roller 8 and eventually cut in the vicinity of follow roller 8.

The second cause of the cutting of the ink ribbon is the heat generated in those portions of solid ink layer 4 which are located below data-recording electrodes 5, in order to record data on recording paper 9. The heat generated in solid ink layer 4 destroys conductive layer 3 or renders layer 3 more electrically resistant. When any portion of layer 3, which has been thus destroyed or made electrically resistance, comes near return electrode 7, the currents applied from data-recording electrodes 5 flows from ribbon 1 to return electrode 7, concentratedly through narrow undestroyed or low-resistant portions of conductive layer 3. Consequently, a great amount of heat is generated in these narrow portions of layer 3, inevitably softening that portion of base film 2 which lies above the undestroyed or low-resistant portions of layer 3. The softened portion of base film 2 cannot withstand the tension applied on that portion of ribbon 1 which extends between electrodes 5 and return electrode 7. As a result, ink ribbon 1 is cut in the vicinity of return electrode 7.

According to the present invention, there is provided a resistance thermal recording apparatus comprising:

an ink ribbon including a base film being electrically resistive and having two opposing surfaces, a conductive layer formed on the first surface of the base film, and an ink layer formed on the conductive layer, having a surface to face and contact the recording medium, and being able to be transferred onto the recording medium when heated;

ribbon-feeding means for feeding said ink ribbon in a first direction;

current-supplying means contacting the second surface of the base film for supplying a signal current to the conductive layer through the base film, thereby to generate heat in the base film, said heat being transferred to the ink layer through the conductive layer, thereby to transfer ink to the recording medium; and current-collecting means located upstream of said first direction with respect to said current-supplying means, and being movable to contact the second surface of the base film, for collecting the signal current supplied from said current-supplying means to the conductive layer.

Since the return electrode is located on the ribbon-feeding side, no heat is generated in any portion of the ink ribbon which has passed the data-recording electrodes and reached the ribbon take-up side. Therefore, the used portion of the ink ribbon is gradually cooled as it is fed to the follow roller. The solid ink layer remaining on the used portion of the ribbon is no longer viscous when it reaches the follow roller, and there is not risk that the ribbon is wrapped around the roller. Thus, the cutting of the ink ribbon is prevented.

Although those portions of the conductive layer which are located below the data-recording electrodes are destroyed a the corresponding portions of the solid ink layer are heated, and thus softened or melted, no current flows through the destroyed portions of the conductive layer again. In other words, no heat is generated in any portion of the conductive layer which is reaching the follow roller and which receives a high tension. The fact reduces the possibility that the ink ribbon is cut at the ribbon take-up side.

BRIEF DESCRIPTION OF THE DRAWINGS

FIGS. 25 to 30A and FIG. 31 are perspective views illustrating various resistance thermal printers according to other embodiments of this invention;

FIGS. 35A and 35B, FIGS. 36A and 36B, and FIGS. 38A and 38B show the waveforms of various current pulses which are selected and used in accordance with the type of image data to record;

FIGS. 37A, 37B, 39A and 39B show the waveforms of the currents which flow through an ink ribbon when the current pulses shown in FIGS. 36A, 36B, 38A, and 38B are supplied to the ink ribbon;

FIG. 40 is a diagram illustrating the position of a specified pixel of image data, and the positions of eight other pixels of the image;

DETAILED DESCRIPTION OF THE PREFERRED EMBODIMENTS

Figure 2:
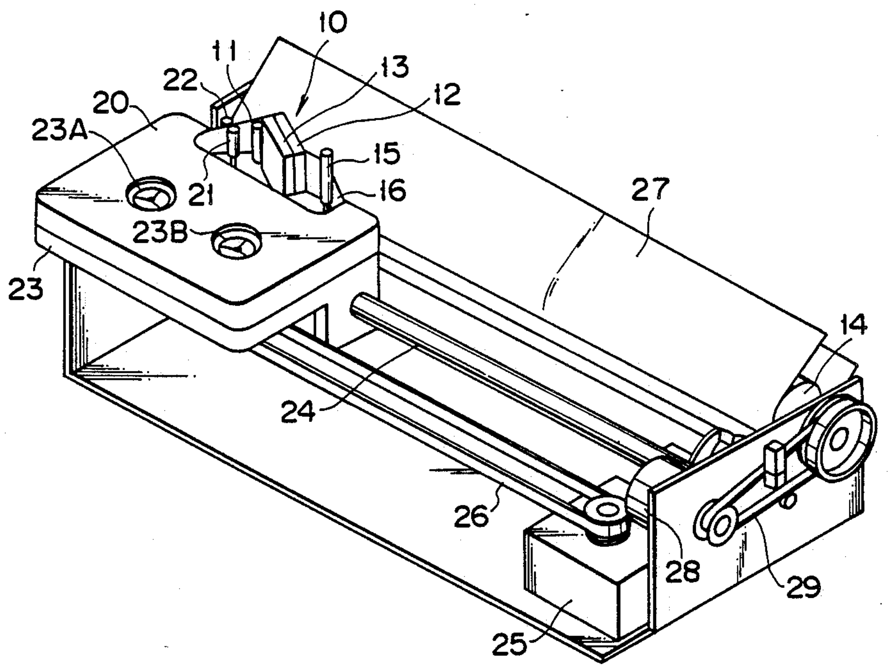
FIG. 2 is a perspective view of an electro, serial thermal printer according to a first embodiment of the present invention.
Figure 3:
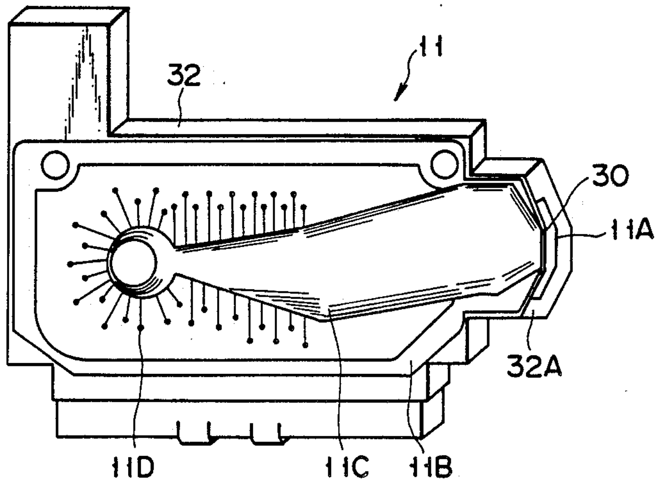
FIG. 3 is a perspective view schematically illustrating the recording head assembly used in the thermal printer shown in FIG. 2.

FIG. 2 is a perspective view showing a serial thermal, or an electrothermal recording apparatus according to an embodiment of the present invention. This serial printer has recording head 11 which is illustrated in detail in FIG. 3. Recording head 11 is opposed to platen 14. It has 5 data-recording electrodes 30, as is shown in FIG. 3. These data-recording electrodes 30 are arranged parallel to one another such that their tips are aligned in a vertical line extending at right angles to the direction in which ink ribbon 16 is fed, in the density of 12 electrodes per millimeter. These recording electrodes 30 are provided within housing 32 made of plastics. Their tips are connected to silicone rubber layer 11A attached to head-supporting section of housing 32. The proximal ends of electrodes 30 are electrically connected to conductive pads 11D formed on polyimide film 11B by means of conductive patterns 11C formed also on polyimide film 11B which in turn is formed on side of housing 32.

As is shown in FIG. 2, recording head 11 is detachably supported by head holders 12 and 13. When head 11 is attached to head supports 12 and 13, the conductive pads 11D are automatically connected to the conductive pads (not shown) of head holder 12. Since the conductive pads of head holder 12 are coupled to signal-generating circuit 31 shown in FIG. 4, conductive pads 11D are electrically connected to signal-generating circuit 31.

Recording head 11 and head holders 12 and 13 constitute head assembly 10. To record data on paper 27 wrapped around platen 14, head assembly 10 is pressed onto paper 27 by head-urging means (not shown). Head assembly 10 is released from paper 27 upon recording data on paper 27. The force for pressing head assembly 10 onto paper 27 is appropriately controlled. This is because ink traces will be formed on paper 27, extending from each printed character, when this force is greater than necessary.

Figure 4:
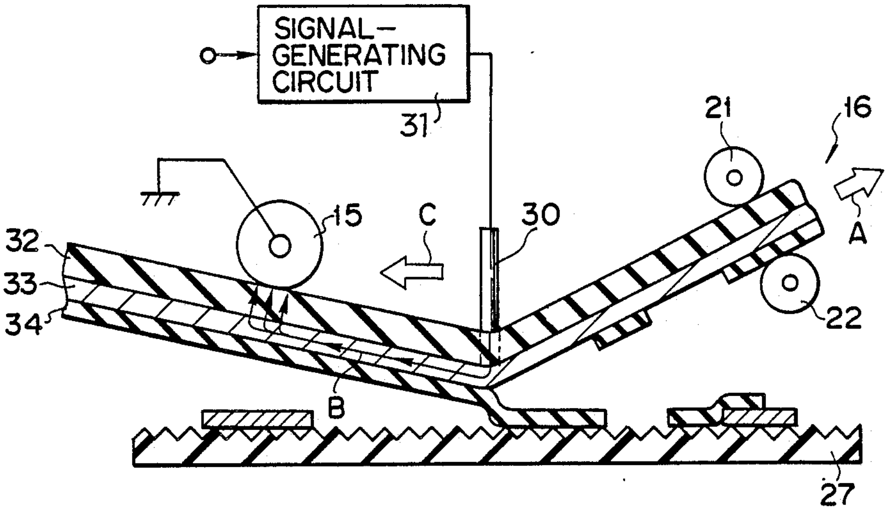
FIG. 4 is a diagram schematically showing the basic structure of the thermal printer shown in FIG. 2.

Return electrode 15 is located upstream of the ribbon-feeding direction, with respect to head assembly 10. In other words, return electrode 15 is located to contact the unused portion of ink ribbon 16. Ink ribbon 16 is contained in ribbon cassette 20, in the form of a roll. As is shown in FIG. 4, ink ribbon 16 is comprised of electrically resistive base film 32, electrically conductive layer 33 formed on resistive layer 32, and solid ink layer 34 coated on conductive layer 33. Resistive base film 32 has a thickness of about 16 μm and is made of polycarbonate containing carbon particles dispersed therein. Conductive layer 33 is an aluminum film vapor-deposited on base film 32 and has a thickness of about 0.1 μm.

Solid ink layer 34 will be melted when heated to a certain temperature, its thickness is about 6 $\mu$m.

A pair of pinch rollers 21 and 22 ar located downstream of the ribbon-feeding direction, with respect to head assembly 10. These pinch rollers 21 and 22 constitute a ribbon-feeding mechanism.

Head assembly 10, return electrode 15, ribbon cassette 20, and the ribbon-feeding mechanism (21, 22) are mounted on carriage 23. Carriage 23 is slidably mounted on guide bar 24 which horizontally extends and is parallel to platen 14. Carriage 23 is connected to timing belt 26. Timing belt 26 is stretched between a pulley (not shown) provided in the left end section of the serial thermal printer, and the pulley fastened to the shaft of carriage-driving motor 25 provided in the right-end section of the printer. Since timing belt 26 is wrapped around both pulleys, carriage 23 is moved to the left or right, along platen 14, when the shaft of motor 25 rotates in one direction or the other.

Platen-driving motor 28 is provided in the right-end section of the serial thermal printer. A pulley is fastened to the shaft of this motor 28. Timing belt 29 is stretched between, and wrapped around, this pulley and the pulley connected to the right end of platen 14. When motor 28 rotates in one direction or the other, platen 14 is rotated to feed paper 27 forward or backward. Paper 27 is, for example, PPC paper having.

The operation of the serial thermal printer shown in FIG. 2 will now be explained.

When the power-supply switch (not shown) of the printer is turned on, carriage 23 is automatically moved to its home position, i.e., to the left end of guide bar 24 Carriage 23 is moved from the home position to the print-start position when motor 25 drives timing belt 26 in response to a print-start signal supplied from a drive signal-generating circuit (not shown). In the meantime, the head-urging mechanism presses recording head 11 and paper 27, with ink ribbon 16 interposed between head 11 and paper 27. Hence, paper 27 is pressed onto platen 14. In this condition, head 11 can print data on paper 27. After carriage 23 has moved to the print-start position, signal-generating circuit 31 (FIG. 4) supplies data signals to recording head 11, and motor 25 is driven at the same time, thereby to move carriage 23 to the right from the print-start position at the speed of about 6 in/sec. Therefore, recording head 11 starts printing data on paper 27. Meanwhile, ink ribbon 16 is fed to the left by pinch rollers 21 and 22, at the speed lower than carriage 23 is moved to the right.

With reference to FIG. 4, it will be explained how the data is recorded on paper 27 wrapped around platen 14.

As is shown in FIG. 4, recording head 11 faces paper 27. Ink ribbon 16 is interposed between paper 27 and data-recording electrodes 30. Electrodes 30 are moved in the direction of arrow C as carriage 23 is driven in the same direction. Data-recording electrodes 30 remain in contact with resistive base film 32 of ribbon 1 while being thus moved. As data signals are supplied to electrodes 30 from signal-generating circuit 31 via conductive pads 11D and conductive patterns 11C, data currents corresponding to these signals flow from electrodes 30 to base film 32. These currents flow through those portions of base film 32 which contact electrodes 30, whereby Joule heat is generated in these portions of film 32. The heat is transferred via conductive layer 33 to those portions of solid ink layer 34 which opposes the heat-generating portions of base film 32. These portions of ink layer 34, therefore, melt into ink drops. The ink drops stick onto paper 27, whereby data is printed thereon.

The data currents further flow to return electrode 15 through conductive layer 33 and that portion of base film 32 which contacts return electrode 15, as is indicated by arrow B. Hence, Joule heat is generated also in this portion of resistive base film 32. Nonetheless, this heat is not sufficient to melt that portion of ink layer 34 which faces said portion of base film 32, since the data currents are far less concentrated in this portion of film 32, which is large, than in those portions of film 32 which contact data-recording electrodes 30.

As has been described, return electrode 15 is located upstream of the ribbon-feeding direction (arrow A in FIG. 4), with respect to head assembly 10. In other words, return electrode 15 contacts the unused portion of ink ribbon 16. Thus, it is through the conductive layer 33 of the unused portion of ribbon 16 that the data currents flow from the heat-generating portions of base film 32 to return electrode 15. The conductive layer 33 of the unused portion of ribbon 16 is neither oxidized nor cracked, it conducts the data currents very well and generates no heat great enough to soften base film 32 or ink layer 34. Hence, ink ribbon 16 is not cut even if it is fed more slowly than data-recording electrodes 30 are moved, in order to accomplish a highspeed recording of data. The serial electrothermal printer shown in FIG. 2 can, thus, record data at high speed.

It will now be explained in greater detail why ink ribbon 16 is prevented from being cut, with reference to FIG. 5A, and why the ink ribbon may be cut in the conventional thermal printer, with reference to FIG. 5B.

Figure 5A:
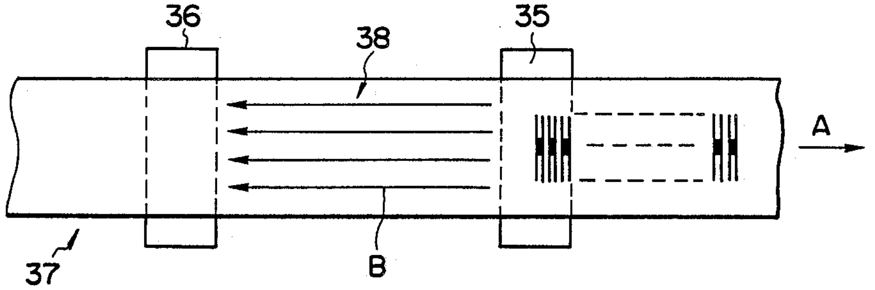
FIG. 5A is a diagram explaining how data currents flow through the ink ribbon while thermal printer shown in FIG. 2 is printing data.
Figure 5B:
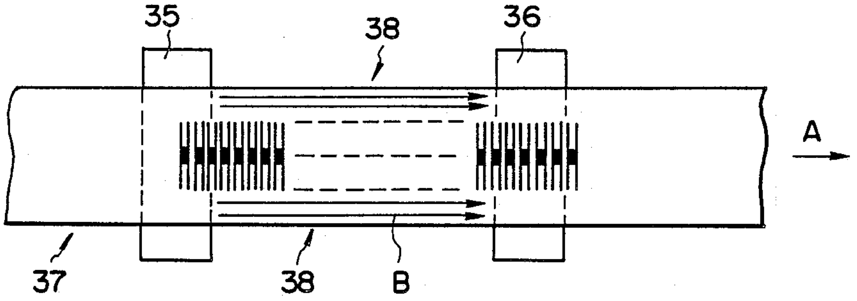
FIG. 5B is a diagram explaining how data currents flow through the ink ribbon while the conventional thermal printer shown in FIG. 1 is printing data.

FIG. 5A illustrates how data currents flow to the return electrode, while the thermal printer of this invention (FIG. 2) is printing characters, and FIG. 5B shows how data current flow to the return electrode, while the conventional thermal printer (FIG. 1) is printing characters. In both figures, numeral 35 designates a recording head having a plurality of data-recording electrodes, numeral 36 denotes a return electrode, numeral 37 represents a resistive ink ribbon, and arrows 38 denote data currents. For the simplicity of explanation, let us assume that in either thermal printer, recording head 35 and return electrode 36 are fixed, and ink ribbon 37 is fed in the direction of arrow A, whereby head 35 prints letters "H" one after another.

The more slowly the ink ribbon is fed to be efficiently used, the shorter the intervals at which letters "H" are printed on the paper (not shown) contacting ink ribbon 37. When letters "H" are thus densely printed on the paper, the conductive layer of the used portion of ribbon 37 is oxidized or cracked due to the heat generated in those portions of the resistive base film which contacts the data-recording electrodes of head 35, except for the lateral edges. The oxidized or cracked portion of the conductive layer is far less electrically conductive than the undestroyed lateral edges of the conductive layer. Further, the resistive base film has become mechanically weak, except for its lateral edges.

Figure 1:
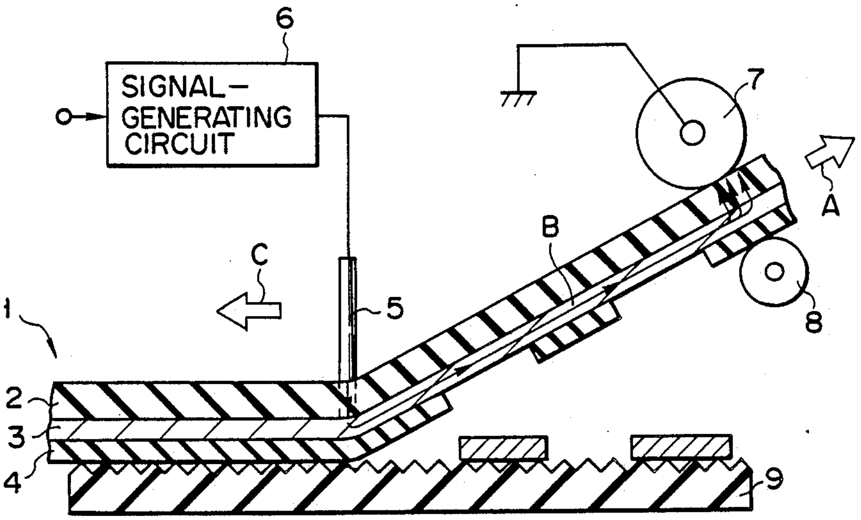
FIG. 1 is a diagram schematically showing a conventional electro, serial thermal printer.

In the conventional thermal printer, data currents 38 flow to return electrode 36, concentratedly through the narrow lateral edges of the conductive layer of ribbon 37, as can be understood from FIG. 5B. As a result, Joule heat is generated in the lateral edges of the conductive layer, inevitably reducing the mechanical strength of the base film and rendering the ink layer viscous. Consequently, the possibility that ink ribbon 37 is cut. The more densely the characters are printed, so as to raise the use efficiency of ink ribbon 37, the more concentratedly the data currents flow through the lateral edges of the conductive layer of ribbon 37, and the greater portion of the resistive base film is heated and softened. Therefore, it is rather difficult to use ink ribbon 37 efficiently in the conventional thermal printer (FIG. 1). Further, the data currents supplied from the data-recording electrodes to ink ribbon 37 cannot flow to return electrode 36 through the conductive layer of the used portion of ribbon 37, under the same condition. The ink dots printed on the paper by softening or melting those portions of the solid ink layer which face the data-recording electrodes, respectively, have different densities, resulting in an insufficient printing quality. In particular, the ink dots transferred from the center portion of ink ribbon 37 are not as dense as required.

In contrast, in the thermal printer according to the present invention, data currents 38 flows to return electrode 36 through the conductive layer of the unused portion of ink ribbon 37, as is shown in FIG. 5A. This is because return electrode 36 is located upstream of the ribbon-feeding direction A, with respect to recording head 35. Since the conductive layer of the unused portion of ribbon 37 is neither oxidized nor cracked, data currents 38 flow through the entire section of the conductive layer. Hence, heat, if generated in the conductive layer, is not great enough to noticeably reduce the mechanical strength of the base film of ribbon 37. In addition, since the data currents supplied from the data-recording electrodes to ink ribbon 37 flow to electrode 36 through the conductive layer under the same condition, the ink dots printed on the paper have the same density, which ensures a satisfactory printing quality.

The inventors hereof conducted experiments in which the conventional serial thermal printer and the serial thermal printer of this invention were operated, by varying the speed of feeding resistive ink ribbon. In the conventional printer, the ink dots printed on the paper by applying data currents to the ribbon from the data-recording electrodes had different densities when the ribbon was fed at the speed 1/1.1 times the speed of moving the data-recording electrodes, and the ink ribbon was cut when it was fed at half the speed of moving the data-recording electrodes. In the printer according to the invention, data could be printed in a sufficiently quality even when the ink ribbon wa fed at one-tenth of the speed of moving the data-recording electrodes, and the ribbon was not cut when the ribbon-feeding speed was reduced to 0.05 or less of the speed of moving the data-recording electrodes. Furthermore, in the printer of this invention, neither the printing quality was insufficient, not the ink ribbon was cut, when the data-recording speed was raised to 15 in/sec, as when this speed was 6 in/sec. In addition, this increase of the data-recording speed did not result in a decrease of the use efficiency of the resistive ink ribbon.

Now, with reference to FIG. 6 through FIG. 9, examples of the serial thermal printer according to this invention will be described.

FIRST EXAMPLE

Figure 6:
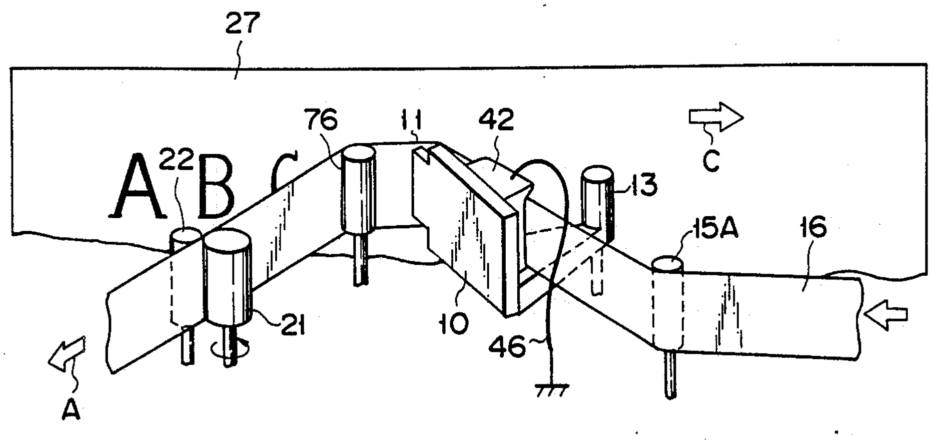
FIG. 6 is a perspective view of a first example of the serial thermal printer shown in FIG. 2.

FIG. 6 shows the data-recording section of the first example of the serial thermal printer. In the first example, ribbon guide 42 is used in place of the return electrode 15 (FIGS. 2 and 4). Ribbon guide 42 which is made of electrically conductive material such as a metal, is mounted on one side of head assembly 10. Guide 42 is electrically insulated from recording head 11 and electrically connected by means of wire 46 to carriage 23 (FIG. 2) which is set at ground potential. Therefore, ribbon guide 42 functions as a return electrode. A pair of pinch rollers 21 and 22, which are located downstream of the ribbon-feeding direction (arrow A), are not connected to carriage 23. Hence, no electric currents can flow into roller 21 or 22 even if these rollers are made of electrically conductive material. Neither roller 21 nor roller 22 functions an electrode; they do nothing but feed the ink ribbon in the direction of arrow A.

As has been pointed out with reference to FIG. 4, no currents flow through that portion of the ink ribbon which extends between recording head 11 and pinch rollers 21 and 22. No heat is, therefore, generated in this portion of the ink ribbon. Hence, any portion of the ribbon which has been heated as it passes recording head 11 is quickly cooled to the normal temperature before it reaches pinch rollers 21 and 22. Any ink layer is no longer viscous when it reaches rollers 21 and 22, and there is no possibility that the ribbon is adversely taken up around pinch roller 21 or 22. Since no heat is generated in that portion of the ink ribbon which extends between head 11 and rollers 21 and 22, the resistive base film of this portion of the ribbon is not softened, and there is no risk that this portion of the ink ribbon is cut.

SECOND EXAMPLE

Figure 7:
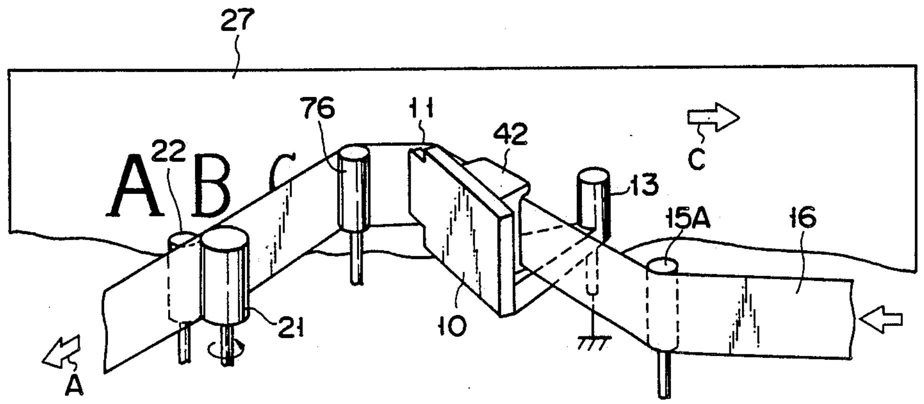
FIG. 7 is a perspective view of a second example of the serial thermal printer shown in FIG. 2.

FIG. 7 shows the data-recording section of the second example of the serial thermal printer according to the present invention. This example is identical to the first example (FIG. 6), except that head holder 13 is coupled to carriage 23 (FIG. 2) which is set at the ground potential. Both ribbon guide 42 and head holder 13 are made of electrically conductive material, and are connected to each other, thus forming a return electrode. Hence, ribbon guide 42 need not be coupled to carriage 23 by means of wire 46 as in the first example. Head holder 13 and ribbon guide 42 can be integrally formed of the same electrically conductive material.

THIRD EXAMPLE

Figure 8:
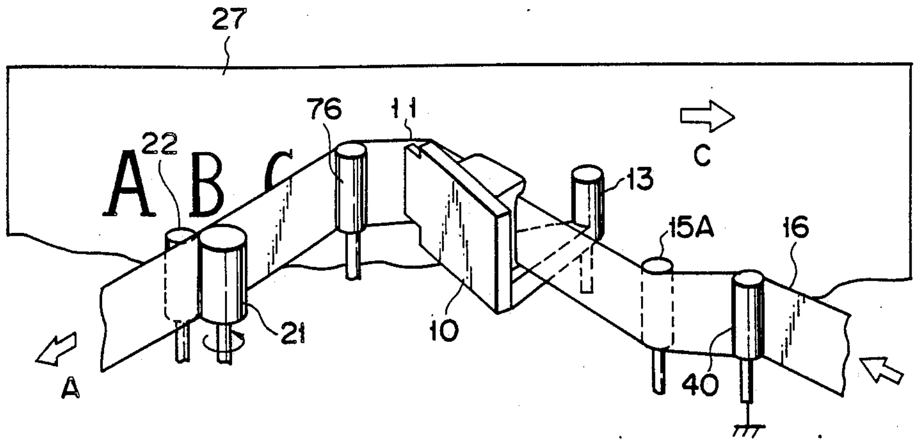
FIG. 8 is a perspective view of a third example of the serial thermal printer shown in FIG. 2.

FIG. 8 illustrates the data-recording section of the third example of the serial thermal printer. The third example is characterized by ribbon-guiding roller 40 which is located upstream of the ribbon-feeding direction (arrow A), with respect to head assembly 10, and contacts the resistive base film of ink ribbon 16. This roller 40 is made of electrically conductive material and is set at the ground potential, and therefore functions as a return electrode.

FOURTH EXAMPLE

Figure 9:
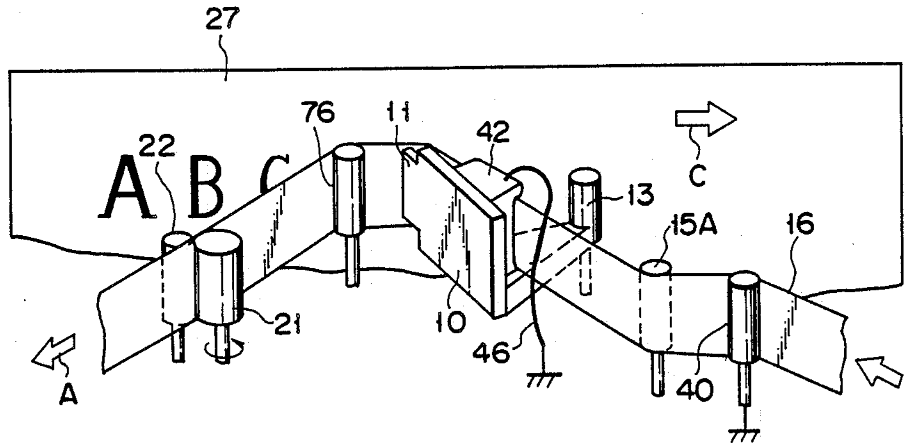
FIG. 9 is a perspective view of a fourth example of the serial thermal printer shown in FIG. 2.

FIG. 9 shows the data-recording section of the fourth example of the serial thermal printer according to the invention. In the third example (FIG. 8), the contact resistance between ribbon-guiding roller 40 (or the return electrode) and the resistive base film of ink ribbon 16 greatly changes as ribbon 16, which is being fed toward head assembly 10, inevitably vibrates. When this contact resistance increases too much, the data currents flowing from those portions of the base film which contact the data-recording electrodes of head 11 to that portion of the base film which contacts roller 40 through the conductive layer of ribbon 1 fail to effectively flow into roller 40. Consequently, the ink dots printed on the paper 27 may have different densities, resulting in an unsatisfactory printing quality, or excessive heat may be generated in that portion of the base film which contacts roller 40, thereby softening this portion of the film, and thus causing the cutting of ink ribbon 16.

In order to avoid such unsatisfactory printing or the cutting of ribbon 16, the fourth example has two return electrodes. More specifically, as is shown in FIG. 9, ribbon-guiding roller 40 identical to the one used in the third example (FIG. 8) is used as the first return electrode, and ribbon guide 42 identical to the one used in the first example (FIG. 6) is used as the second return electrode. When the contact resistance between one of these return electrodes and the resistive base film of ribbon 16 is too high, the data currents flow into the other return electrode which has a lower contact resistance. Needless to say, the more return electrodes, the better.

Figure 10A:
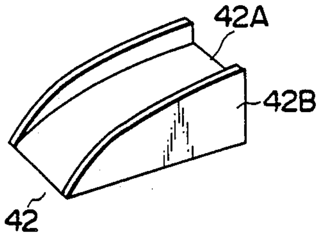
FIGS. 10A to 10C are side views showing three modifications of the ribbon guide used in the serial thermal printers shown in FIGS. 6 to 9.

FIG. 10A shows ribbon guide 42 used in the first, second, third and fourth examples—all described with reference to FIG. 6 through FIG. 9. As is shown in FIG. 10A, ribbon guide 42 has sloping surface 42A and two lateral edges 42B. Ink ribbon 16 is guided, sliding on sloping surface 42A and being prevented by lateral edges 42B from slipping off sloping surface 42A. As has been pointed out, it is necessary to reduce the changes in the contact resistance between surface 42A and the base film of ribbon 16, as much as possible, thereby to accomplish a high-quality printing and to prevent the cutting of ribbon 16.

Figure 10B:
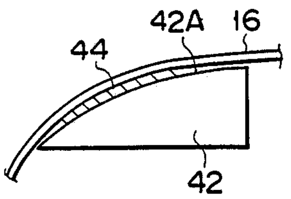
Figure 10C:
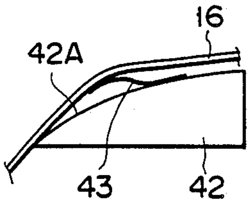

FIGS. 10B and 10C show two modifications of ribbon guide 42, which are designed to minimize the contact resistance between sloping surface 42A and the base film of ink ribbon 16. The modified guide 42 shown in FIG. 10B includes electrically conductive fabric 44 adhered to sloping surface 42A. Since it is this fabric 44 that the base film contacts as ribbon 16 is guided by ribbon guide 42, the changes in the contact resistance can be reduced. On the other hand, the modified guide 42 shown in FIG. 10C includes electrically conductive leaf spring 43 attached to sloping surface 42A. Spring 43 also reduces the changes in the contact resistance between ribbon guide 42 and the base film of ink ribbon 16.

When ribbon guide 42 shown in FIG. 10A is used as a return electrode, the entire sloping surface 42A must be made of electrically conductive material. When the ribbon guide shown in FIG. 10B or 10C is used as a return electrode, it suffices if only that portion of sloping surface 42A to which leaf spring 43 or fabric 44 is attached.

Figure 11B:
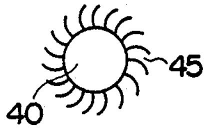
FIGS. 11A to 11C are side views showing three modifications of the ribbon-guiding roller used in the serial thermal printers illustrated in FIGS. 6 to 9.
Figure 11A:
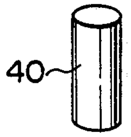
Figure 11C:
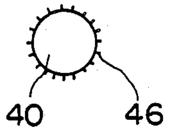

FIG. 11A shows ribbon-guiding roller 40 used in the first, second, third and fourth examples which are shown in FIGS. 6 to 9. As is illustrated in FIG. 11A roller 40 has a smooth circumference. As has been discussed, it is required to minimize the changes in the contact resistance between roller 40 and the base film of ink ribbon 16. FIGS. 11B and 11C show two modifications of ribbon-guiding roller 40, which are designed to reduce the changes in this contact resistance. The modified roller shown in FIG. 11B has fabric filaments 45 protruding from the circumference of the roller. The modified roller shown in FIG. 11C has protrusions 46 formed on the circumference of the roller. Filaments 45 and protrusions 46 are electrically conductive. Therefore, they serve to reduce the changes in the contact resistance between the roller and the base film of ribbon 16.

As has been described, the serial thermal printer shown in FIGS. 2 and 4 is characterized in that the return electrode is located upstream of the ribbon-feeding direction, with respect to the data-recording electrodes, and thus contacts the unused ink ribbon. Therefore, it is through the undestroyed portion of the conductive layer that the data currents flow from the data-recording electrodes to the return electrode. Hence, the data currents can be sufficiently large, and they can flow from the data-recording electrodes under the same condition. Further, no currents flow through the used portion of the ribbon, which is mechanically weak, to heat this portion so as to reduce the mechanical strength thereof. Thus, there is substantially no possibility that the ribbon is cut, even when the ribbon is fed more slowly than the data-recording electrodes are moved, in order to enhance the use efficiency of the ink ribbon and, thus, to reduce the running cost of the printer. In addition, since large data currents can be supplied from the data-recording electrodes to the resistive ink ribbon, the printer can record data at high speed, while efficiently using the ink ribbon.

The present invention can be applied to a line thermal printer, in which case the data currents flow from the numerous data-recording electrodes of the line print head to a return electrode through the unused portion of a resistive ink ribbon under the same condition. Therefore, the line thermal printer can print data in high quality, and can also use the ink ribbon with high efficiency.

Figure 12:
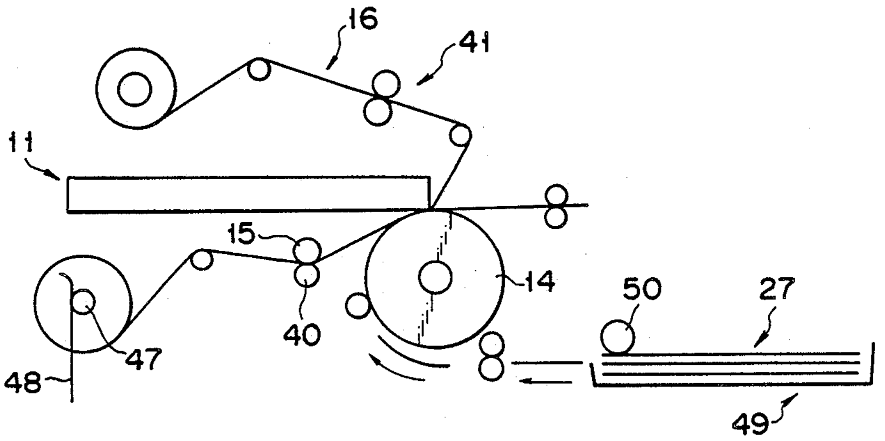
FIG. 12 is a diagram schematically an electrothermal printer according another embodiment of this present invention.

FIG. 12 is a diagram schematically showing a line thermal printer according to the invention. This printer has line print head 11, platen 14, return electrode 15, follow roller 40, and ribbon-feeding mechanism 41. Head 11 has a number of data-recording electrodes (not shown) arranged in a line extending parallel to platen 14. A head-urging means (not shown) presses head 11 onto platen 14 such that resistive ink ribbon 16 is interposed between head 11 and paper 27 wrapped around platen 14, not staining paper 27 with ink, and being able to be fed. Return electrode 15 is a rotatable roll bar made of a metal and connected to the ground. Electrode 15 and follow roller 40 pinches ink ribbon 16. Ribbon-feeding mechanism 41 comprises a pair of pinch rollers and a stepper motor (not shown). The stepper motor rotates one of the pinch rollers, thereby to feed ink ribbon 16. Ink ribbon 16 can be fed by ribbon-feeding mechanism 41, and is controlled by brake mechanism 48 which controls the rotation of ribbon-feeding reel 47. Ribbon 16 is, thus, moved independently of recording paper 27. Sheets of recording paper 27 are stored in cassette 49. Paper-feeding roller 50 contacts the upper most sheet stored in cassette 49, and hence feeds sheets 27 from cassette 49 toward platen 14, as it is rotated by a drive means (not shown). Each sheet 27 fed from cassette 49 is wound around platen 14 and fed further as platen 14 is rotated. The sheet 27 is thus eventually come into contact with ink ribbon 16, which in turn contact the tips of data-recording electrodes of line print head 11.

As is clearly shown in FIG. 12, return electrode 15 of this line thermal printer is located also upstream of the ribbon-feeding direction, with respect to the data-recording electrodes of head 11, and thus contacts the unused portion of ink ribbon 16. Therefore, the line thermal printer achieves the same advantages as the serial thermal printer shown in FIGS. 2 and 4.

Data currents flow through a greater portion of an ink ribbon when a line thermal printer prints data than when a serial thermal printer prints data. Hence, it is very difficult for a line printer to print dots in the same density, particularly when the ink ribbon is fed slowly, thereby to use the ribbon efficiently. The results of the experiment performed on a line thermal printer (FIG. 12) of the present invention show that data could be printed in sufficient quality even when ink ribbon 16 was fed at one-fifth the speed of feeding recording paper 27.

Further embodiments of the present invention, which are serial thermal printers, will be described with reference to FIG. 13 through FIG. 31. In FIGS. 13 to 31, the identical components are designated by the same numeral.

Figure 13:
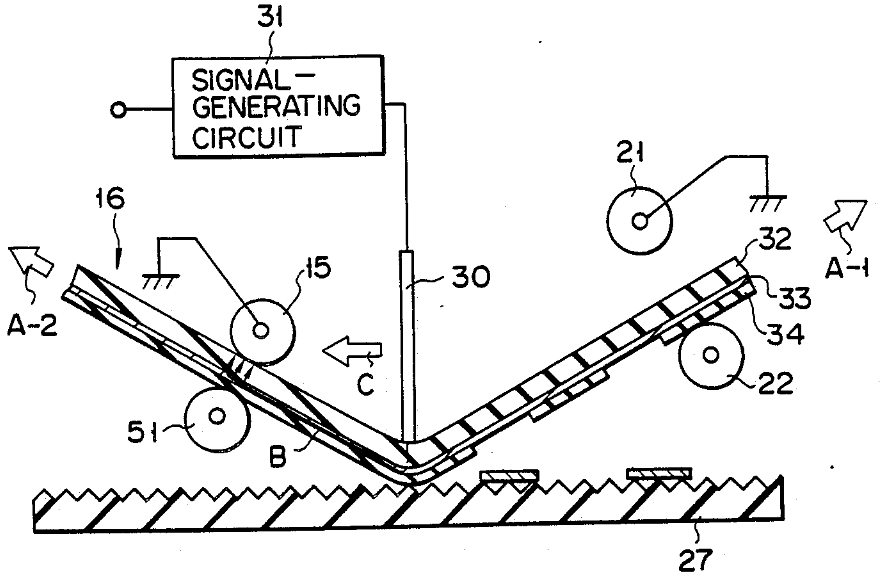
FIG. 13 is a diagram schematically showing a modification of the electrothermal printer illustrated in FIG. 4.

The serial thermal printer shown in FIG. 13 comprises a first pair of follow rollers 21, 22 and a second pair of follow rollers 15 and 51, both pairs being arranged in the path of ink ribbon 16. Follow rollers 21, 22, 15, and 51, and motors (not shown) constitute ribbon-feeding mechanism which can feed ribbon 16 forward and backward, so that ink ribbon 16 can be repeatedly used to print data. The solid ink layer 34 of ribbon 16 is rather thick, for example 10 $\mu$m, so that image data can be recorded in the density of 1.2. Follow rollers 21 and 15 are connected to the ground, and thus function as return electrodes.

To feed ink ribbon 16 forward, in the direction of arrow A-1, follow roller 21 is moved out of contact with ink ribbon 16 as is shown in FIG. 13, whereas follow rollers 15 and 51 contact ribbon 16. Conversely, to feed ribbon 16 backward, in the direction of arrow A-2, follow roller 15 is moved out of contact with ribbon 16, whereas follow rollers 21 and 22 contact ink ribbon 16. Follow rollers 21 and 15, both functioning as return electrodes, are engaged with, or disengaged from, ink ribbon 16 by means of a cam-clutch mechanism of the known type (not shown).

Figure 14:
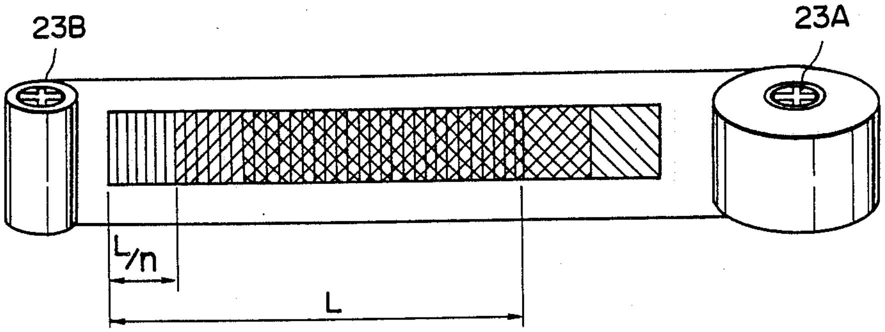
FIG. 14 is a perspective view showing the ink ribbon and the ink ribbon reels, all used in the printer shown in FIG. 13.

The operation of the serial electrothermal printer shown in FIG. 13 will now be explained, with reference to FIG. 14 showing resistive ink ribbon 16.

First, as in the printer shown in FIG. 4, ink ribbon 16 is fed in the direction of arrow A-1, while recording head 11 is moved in the direction of arrow A-2, whereby a first one line of data is printed on recording paper (not shown). When carriage 23 reaches the rightmost printing position, recording head 11 is moved away from platen 14 by means of the head-urging means. Then, platen-driving motor 28 (FIG. 2) rotates platen 14, thereby feeding paper 27 forward by one line-space distance. While paper 27 is being fed forward, ribbon reel 23B is rotated by a reel-driving motor (not shown), thus taking up ribbon 16 by distance L/n, where L is the one-line length (=180 mm), and n is the number of times the ribbon is repeatedly used (=10). Hence, 18 mm of ink ribbon 16 is taken up around reel 23B.

Thereafter, recording head 11 is pressed onto platen 14 by the head-urging means. Follow roller 21 (i.e., the return electrode) is simultaneously is brought into contact with resistive ink ribbon 16, and cooperates with follow roller 22 to pinch ink ribbon 16. At the same time, follow roller 15 (i.e., the other return electrode) is moved away from ink ribbon 16. Then, carriage 23 is moved in the direction of arrow A-1, while data signals are being supplied from signal-generating circuit 31 to head 11 in the order reverse to the order in which the data signals have been supplied to head 11 during the printing of the first line. Meanwhile, reel 23A is rotated by the reel-driving motor (not shown) now coupled to reel 23A by means of a one-way clutch (not shown, either). Therefore, ink ribbon 16 is taken up around reel 23A at the same speed carriage 23 move to the leftmost printing position. When carriage 23 reaches the leftmost printing position, the printing of the second line is completed. Then, recording head 11 is moved away from platen 14. Platen 14 is rotated, thus feeding recording paper 27 forward by one line-space distance. While paper 27 is being fed forward, ribbon reel 23B is rotated, taking up 18 mm of ink ribbon 16.

The sequence of the operations described in the two preceding paragraphs is repeated until all necessary data is recorded on paper 27. As can be understood from FIG. 14, every time the printer prints one line of data, ink ribbon 16 is fed forward for the distance of L/n (=18 mm), and the same portion of ribbon 16 can be used n times. Needless to say, the distance the ribbon is fed upon completion of every one-line printing can be longer than L/n. Nonetheless, the shorter this distance, the more efficiently the ribbon is used.

The serial thermal printer shown in FIG. 13 can print data even on coarsely textured paper such as PPC paper, at the speed of 60 cps (character per second) in the high density of 12 dots/mm. Since this printer can print data in either direction, that is, from the left to right, and from the right to the left, the time required to print the same amount of data is half the time required by the conventional serial thermal printer which cannot print data in either direction.

The serial thermal printer shown in FIG. 15 will now be described. This printer comprises ribbon-feeding reel 56, a pair of ribbon-guiding rollers 57A and 57B, and ribbon take-up reel 58. Back tension is applied on ribbon-feeding reel 56, so that resistive ink ribbon 16 does not slacken between recording head 11 and ribbon take-up reel 58. Ribbon take-up reel 58 is controlled by a reel control mechanism (not shown).

The operation of the printer shown in FIG. 15 will be explained. When the power-supply switch of the printer is turned on, carriage 23 is moved to the home-position, or the leftmost printing position, with recording head 11 held out of contact with platen 14. While carriage 23 is being thus moved, the reel control mechanism drives ribbon take-up reel 58 such that an unused portion of ribbon 16, which is as long as each line of data to be printed, is fed from reel 56. In response to a print-start signal, a head-urging means (not shown) presses recording head 11 toward platen 14 whereby ribbon 16 and recording paper 27 are pinched between head 11 and platen 14. Ribbon 16 is also pinched between cylindrical return electrode 21 and follow roller 22, both mounted on carriage 23 and located downstream of head-moving direction (arrow A-1). Return electrode 21 contacts the resistive base film of ink ribbon 16. Cylindrical return electrode 15 and follow roller 51, both mounted on carriage 23 and located upstream of head-moving direction (A-1) with respect to head 11, do not contact ink ribbon 16.

In this condition, carriage 23 is moved in the direction of arrow A-1, thus printing data. During this data-printing operation, resistive ink ribbon 16 is not moved, in which respect this printer is different from the printer shown in FIG. 15. When carriage 23 reaches the rightmost printing position, recording head 11 is moved away from platen 14, and platen 14 is rotated, thus feeding paper 27 forward by one line-space distance. Then, head 11 is pressed toward platen 14, whereby ink ribbon 16 and recording paper 27 are pinched between head 11 and platen 14. At the same time, return electrode 21 is moved away from ink ribbon 16, and return electrode 15, which is located downstream of head-moving direction A-2, with respect to head 11, is put into contact with ink ribbon 16. In this condition, carriage 23 is moved in the direction of arrow A-2, thereby printing the second line of data on recording paper 27.

In such a manner as has been described, carriage 23 is moved repeated between the leftmost and rightmost printing positions, until recording head 11 prints ten lines of data. Upon completion of the printing of ten lines of data the reel control mechanism drives ribbon take-up reel 58, whereby the next unused portion of ribbon 16, which is as long as one line of data, is fed from ribbon-feeding reel 26, while the used portion of the same length is taken up around reel 28. Namely, whenever the same portion of ink ribbon 16 has been used a predetermined number of time, this portion is taken up around ribbon take-up reel 28, while the used portion of the ribbon, which has the same length, is fed from ribbon-feeding reel 56.

Figure 15:
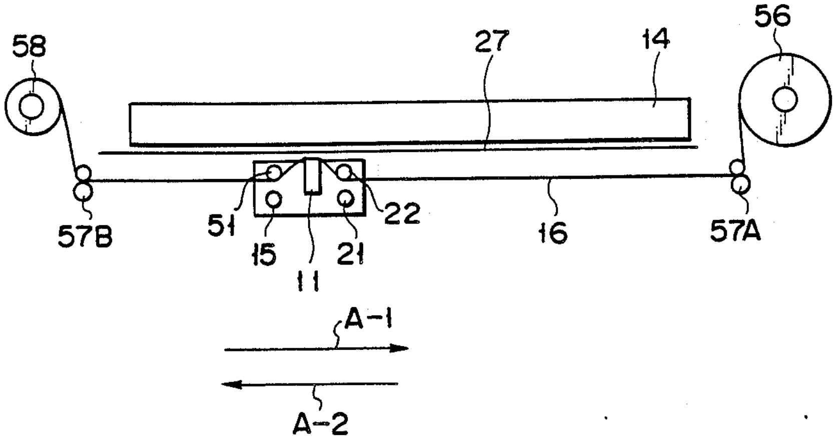
FIGS. 15 and 16 are diagrams schematically showing a modification of the printer illustrated in FIG. 13.
Figure 16:
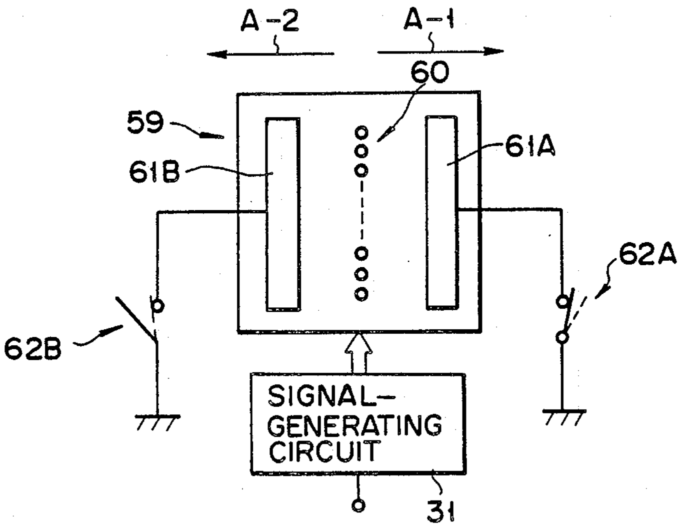

The embodiments shown in FIGS. 13 and 15 each have two return electrodes which are set far apart from each other. The return electrodes can be located close to each other, in accordance with the present invention. FIG. 16 schematically show another serial thermal printer, wherein two return electrodes 61A and 61B are mounted on recording head 59, and thus located very near data-recording electrodes 60. As is shown in FIG. 16, data-recording electrodes 60 are arranged parallel and one above another, such that their tips are aligned in a vertical line. Return electrodes 61A and 61B are placed on recording head 59, vertically extend parallel to each other, with the array of electrodes 60 between them. Return electrode 61A is grounded by switch 62A, whereas return electrode 61B is grounded by switch 62B. When recording head 59 is moved in the direction of arrow A-1, switch 62A coupled to return electrode 61A is closed, whereas switch 62B coupled to return electrode 61B is opened. Hence, the data currents supplied from data-recording electrodes 60 to the resistive ink ribbon (not shown) flow to return electrode 61A located downstream of head-moving direction A-1, with respect to the array of data-recording electrodes 60. Conversely, when recording head 59 is moved in the direction of arrow A-2, switch 62B is closed, whereas switch 62A is opened. As a result, the data currents flows from data-recording electrodes 60 to return electrode 61B located downstream of head-moving direction A-2, through the unused portion of the ink ribbon (not shown). In other words, only the return electrode which is located downstream of the head-moving direction, with respect to the array of data-recording electrodes 60, is used so as to lead the data currents the ground. Hence, the embodiment shown in FIG. 16 can attain the same advantages as the serial thermal printers shown in FIGS. 13 and 15.

Figure 17:
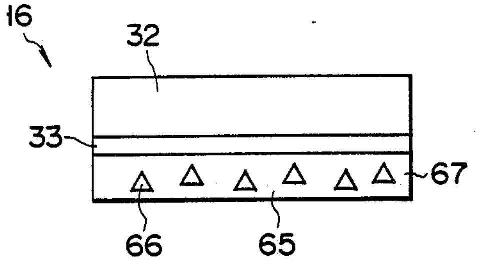
FIG. 17 is a diagram schematically showing an ink ribbon which ca be used in the present invention.

Resistive ink ribbon 16, which is used in all embodiments described above, is comprised of, as is shown in FIGS. 4 and 13, resistive base film 32, electrically conductive layer 33, and solid ink layer 34. This ink ribbon can be replaced by another three-layer ribbon 16 which is shown in FIG. 17. As is illustrated in FIG. 17, this resistive ink ribbon 16 consists of resistive base film 32, electrically conductive layer 33 formed on base film 32, and porous ink-impregnated layer 65. Ink-impregnated layer 65 contains solid particles 66 of ink which can be softened, melted, or sublimed when heated to a predetermined temperature.

Figure 18:
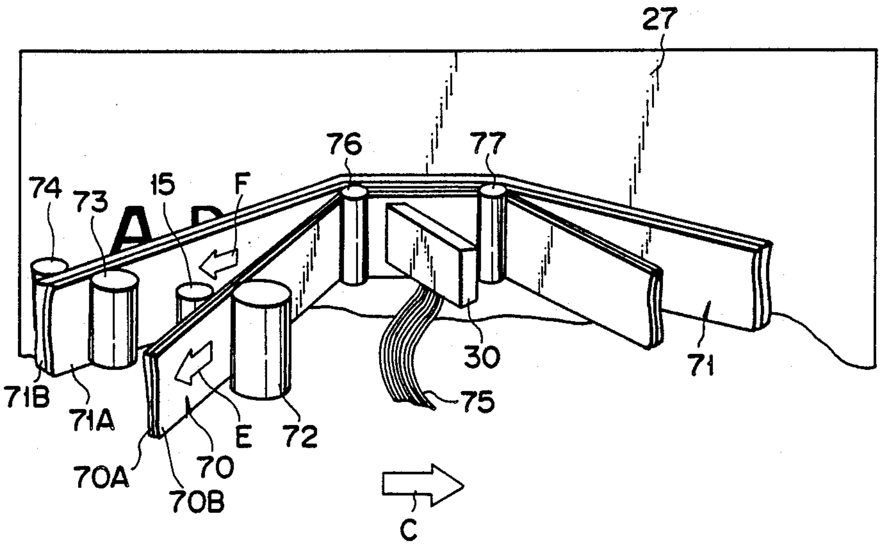
FIGS. 18 to 23 are perspective views illustrating various resistance thermal printers according to further embodiments of the present invention.

The three-layer ink ribbon 16 shown in FIGS. 4 and 13, or the three-layer ink ribbon 16 shown in FIG. 17 can be replaced by the two-layer ink ribbons 70 and 71, both shown in FIG. 18. Ribbon 70 is designed to generate heat, whereas ribbon 71 is designed to print data. During use, heat-generating ribbon 70 is in contact with recording head 5, and data-printing ribbon 71 is interposed between ribbon 70 and paper 27. When these ribbons 70 and 71 are used as is shown in FIG. 18, return electrode 15 need not be located upstream of ribbon-feeding direction, with respect to recording head 5, in order to efficiently supply data currents from the data-recording electrodes of head 5 to return electrode 15. In addition, when ribbons 70 and 71 are thus used, heat-generating ribbon 70 can be quickly cooled as it is fed from head 5, thereby reducing the possibility that ribbon 70 is cut.

As can be understood from FIG. 18, heat-generating ribbon 70 is comprised of resistive base film 70A and electrically conductive layer 70B formed on base film 70A. Ribbon 70 is pinched between cylindrical return electrode 15 and pinch roller 72 which are located downstream of the ribbon-feeding direction, with respect to recording head 5. Return electrode 15 is rotated, thereby feeding heat-generating ribbon 70 in the direction of arrow E. Return electrode 15 is set at the ground potential. On the other hand, data-printing ribbon 71 consists of base film 71A and solid ink layer 71B formed on base film 71A. Ribbon 71 is pinched between pinch rollers 73 and 74, both made of rubber and located downstream of the ribbon-feeding direction with respect to head 5. Either or both pinch rollers 73 and 74 are rotated, thus feeding data-printing ribbon 71 in the direction of arrow F.

Recording head 5 has 40 data-recording electrode (not shown). Data currents are supplied to these data-recording electrodes from a constant-current source circuit (not shown, either) via a connecting cable 75.

Heat-generating ribbon 70 and data-printing ribbon 71 are fed from two ribbon-feeding reels (not shown) respectively, are laid one upon the other, while moving from roller 77 to roller 76, and are taken up around two ribbon take-up reels (not shown). The data-recording electrodes of head 5 supply the data currents to that portion of ribbon 70 which extends between rollers 76 and 77, whereby heat is generated in those portions of base film 70A which contact the data-recording electrodes. The heat is transferred to solid ink layer 71B of ribbon 71 via conductive layer 70B and base film 71A, whereby data is recorded on paper 27.

In the embodiment shown in FIG. 18, heat-generating ribbon 70 is repeatedly used, whereas data-printing ribbon 71 cannot be used repeatedly. Since ribbon 70 is repeatedly used, the running cost of this serial thermal printer is lower than that of the embodiments described above, wherein the expensive conductive layer 33 cannot be used two or more times. Like the embodiments described above, the printer shown in FIG. 18 has the advantages inherent in resistance thermal printers. More specifically, the printer can record data at high speed, can quickly cool the ribbon after the use thereof, and can apply great energy to the ribbon. Since the ribbon can be quickly cooled after use even if great energy has been applied to it, the printer can record data at high speed even when use is made of solid ink having a high melting point and being suitable for printing data on coarsely textured paper, or of solid ink which sublimes when heated and is thus suitable for printing images in different tones.

Figure 19:
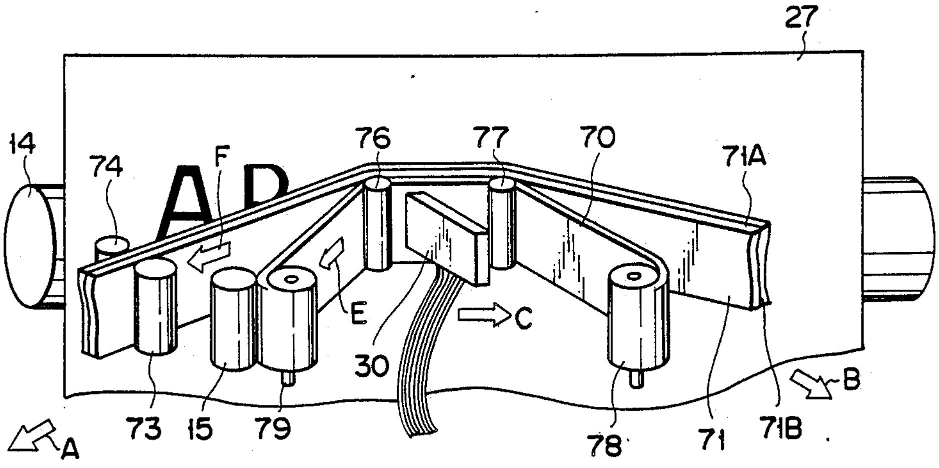

FIG. 19 shows a modification of the printer shown in FIG. 18, wherein heat-generating ribbon 70 is repeatedly used, too. As is illustrated in FIG. 19, heat-generating ribbon 70 is fed from ribbon-feeding reel 78 and taken up around ribbon take-up reel 79, in the direction of arrow E. After ribbon 70 is used, it is fed in the direction of arrow B back to reel 78 from reel 79, so that it can be used again. The operation of the printer shown in FIG. 19 will be briefly explained. While recording head 11 is moving in the direction of arrow C and supplying data currents to ribbon 70, both ribbons 70 and 71 are fed together in the direction of arrow A, with ribbon 70 held in contact with the data-recording electrodes of head 5. As a result, one line of data is printed on paper 27 which is wrapped around platen 14. Then, heat-generating ribbon 70 is fed in the direction of arrow B, back to ribbon-feeding reel 78, so that is can be used for printing the next line of data on paper 27. The amount of ribbon 70 fed back to reel 78 is less than the amount fed forward to ribbon take-up reel 73. The difference between the amount fed forward and the amount fed back is determined by the number of times the heat-generating ribbon 70 is reused.

Figure 20:
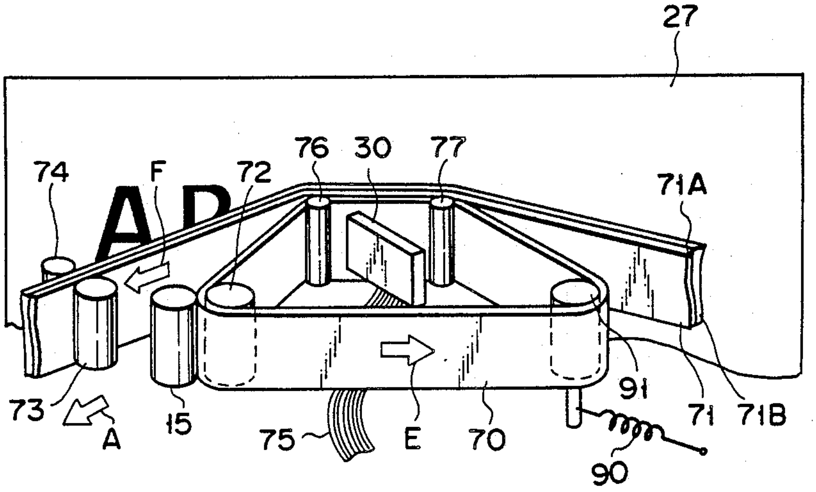

FIG. 20 shows another modification of the printer shown in FIG. 18, wherein the heat-generating ribbon is an endless one and repeatedly used. As is shown in FIG. 20, endless ribbon 70 is wrapped around four rollers 72, 76, 77, and 91, and is driven in the direction of arrow E, as roller 15, which cooperates with roller 72 to pinch ribbon 70, is rotated. This roller 15 functions as a return electrode. Roller 91 is urged by spring 90, thus applying an appropriate tension on heat-generating ribbon 70. Since heat-generating ribbon 70 is used again and again, the running cost of this printer is also low.

Figure 21:
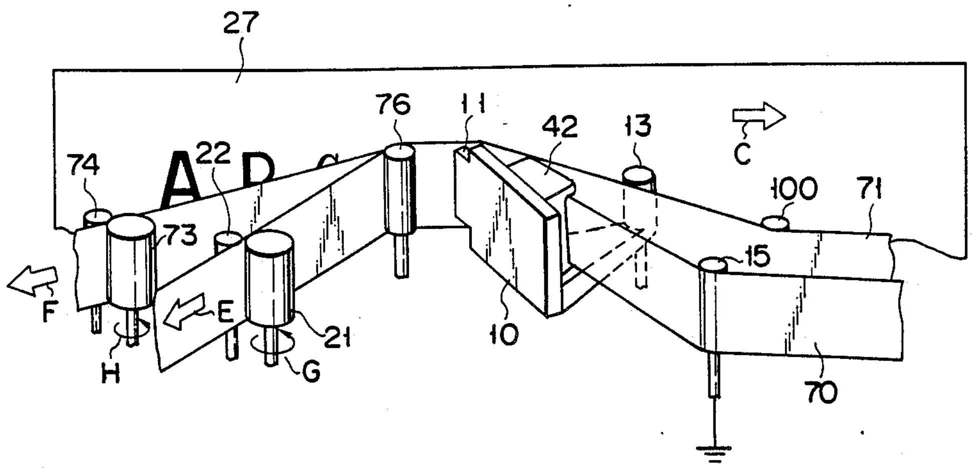
Figure 22:
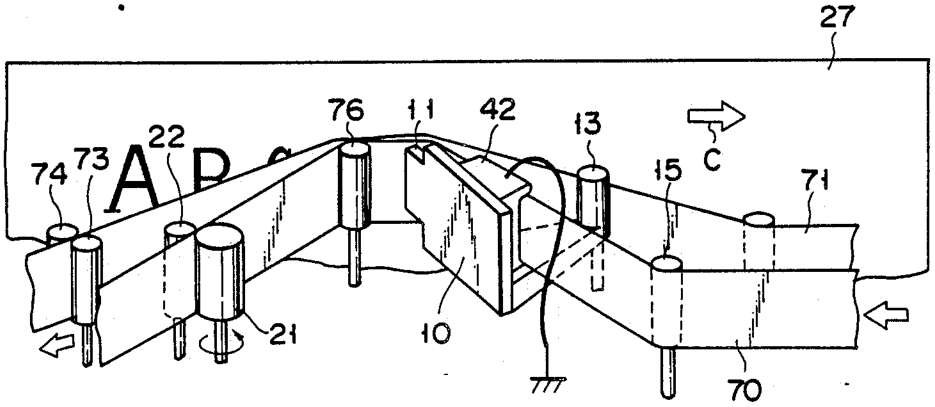
Figure 23:
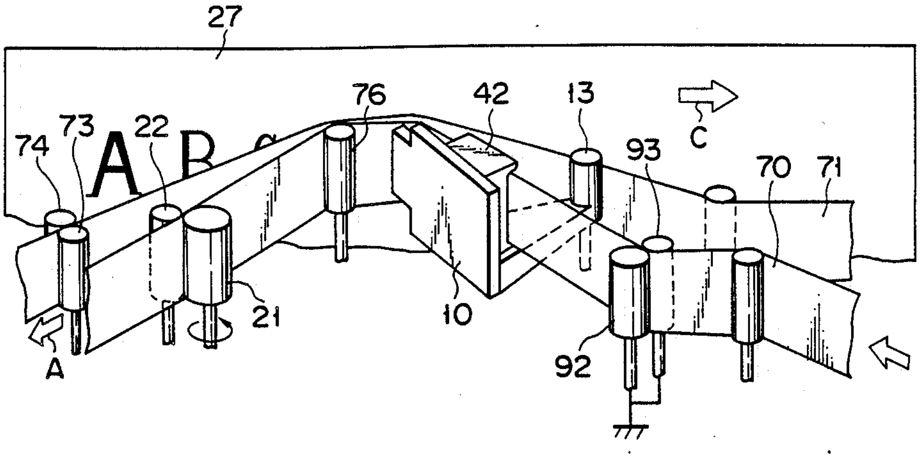

Also in the printers shown in FIGS. 18 to 20, return electrode 15 may be located upstream of the ribbon-feeding direction E, with respect of recording head 11. If electrode 15 is so located, the heat-generating ribbon can be more efficiently used and more effectively prevented from being cut. FIGS. 21 to 23 illustrate three printers, each using heat-generating ribbon 70 and data-printing ribbon 71 and having a return electrode located upstream of the ribbon-feeding direction. These printers will now be described.

In the serial thermal printer shown in FIG. 21, heat-generating ribbon 70 is guided by roller 15 to recording head 11, whereas data-printing ribbon 71 is guided by roller 100 to head 11. Ribbons 70 and 71 are laid one upon the other, at recording head 11. They remain in contact with each other until they reach roller 76, and are then separated from each other. Heat-generating ribbon 70 is pinched between drive roller 21 and pinch roller 22, and is fed forward as drive roller 21 is rotated. Similarly, data-printing ribbon 71 is pinched between drive roller 73 and pinch roller 74, and is fed forward as drive roller 73 rotates. More precisely, ribbons 70 and 71 are fed in the directions of arrows E and F as drive rollers 21 and 73 rotate in the directions of arrows G and H.

Ribbons 70 and 71 are fed from two ribbon-feeding reels (not shown), respectively, and are taken up around two ribbon take-up reels (not shown, either) after passing drive rollers 21 and 73. Back tension is applied to both ribbons 70 and 71 by two back tension-applying mechanisms (not shown), and do not slacken while being fed from the ribbon-feeding reels to the ribbon take-up reels. Rollers 15, 21, 22, 73, 74, 76 and 100, the ribbon-feeding reels, the ribbon take-up reels, and the back tension-applying mechanisms are mounted on carriage 23 (FIG. 2). Carriage 23 is moved in the direction of arrow C at the average speed of Va, thereby to print data on recording paper 27.

Recording head 11 is fastened to carriage 23 by head holder 13 and can rotate the axis of holder 13. Head 11 is pressed onto recording paper 27 in order to record data on paper 27. Roller 15 not only guides heat-generating ribbon 70 to head 11, but also functions as a return electrode. It is made of electrically conductive material such as a metal, and is set at the ground potential.

Speed Vb of feeding heat-generating ribbon 70 is determined by the circumference of drive roller 21 and the rotational speed thereof. Likewise, speed Ve of feeding data-printing ribbon is determined by the circumference of drive roller 73 and the rotational speed thereof. If Vb and Ve are equal to Va as in the conventional serial thermal printer, neither ribbon moves at all relative to recording paper 27 since either ribbon is fed in the direction opposite to the head-moving direction C. In this case, the same length of either ribbon as the length of one line of data is consumed to record this line of data on paper 27. In the embodiment shown in FIG. 21, Vb is less than Va; that is, heat-generating ribbon 70 is fed more slowly in the direction of arrow E than recording head 11 is moved in the direction of arrow C. Hence, ribbon 70 moves relative to paper 27 at the speed of Va-Vb (greater than 0) in the direction of arrow C. As a result, the consumption of ribbon 70 is smaller than in the conventional printer. Speed Vb is made less than Va by either rotating drive roller 21 at low speed, or reducing the diameter of drive roller 21. In the present instance, the diameter of roller 21 is reduced. When the diameter of roller 21 is decreased to one half, the consumption of heat-generating ribbon 70 will be reduced to one half.

The consumption of data-printing ribbon 71 can be reduced, too, by reducing the diameter of drive roller 73 or by decreasing the rotational speed of roller 73.

Since the consumption of heat-generating ribbon 70 is thus reduced, more heat accumulates in the unit area of ribbon 70, and the possibility that ribbon 70 is cut may increase. However, this possibility does not increase since roller 15, which functions as the return electrode, is located upstream of the ribbon-feeding direction E. Rather, since much heat accumulates in the unit area of ribbon 70, ribbon 70 pre-heats data-printing ribbon 71, whereby data can be recorded at high speed. The printer shown in FIG. 21 can therefore operate effectively to record data at the speed of 100 cps or more, particularly when the solid ink layer melts at high temperatures or sublimes at a predetermined temperature.

Since no currents flow through any used portion of heat-generating ribbon 70, ink dots can be formed on paper 27 in the same density, and data-printing ribbon 71 is prevented from being cut. Furthermore, heat-generating ribbon 70 is saved. The resistance thermal printer shown in FIG. 21 can, therefore, records high-quality image data at a low running cost.

The serial thermal printer shown in FIG. 22 is, so to speak, a modification of the printer illustrated in FIG. 21. As is shown in FIG. 22, ribbon guide 42 is connected to the ground and, thus, functions as a return electrode. Heat-generating ribbon 70 is fed to recording head 11, while being guided by, and in contact with, ribbon guide 42. As ribbon 70 is thus fed, the contact resistance between ribbon 70 and guide 42 is likely to change very much. When this contact resistance changes excessively, ribbon guide 42 fails to function as a return electrode. If this happens, ink dots cannot be formed on paper 27 in the desired density, or heat-generating ribbon 70 may be cut. These are the problems with the printer shown in FIG. 22.

The serial thermal printer illustrated in FIG. 23 is designed to solve the problems of the printer shown in FIG. 22. As is shown in FIG. 23, a pair of rollers 92 and 93 are located upstream of the ribbon-feeding direction of A, with respect to ribbon guide 42, and pinch heat-generating ribbon 70. Both rollers 92 and 93 can be made of electrically conductive material. Alternatively, one of them has a rubber coating on its circumference, and the other of them is made of electrically conductive material. In the latter case, ribbon 70 must contact the roller made of electrically conductive material.

Figure 24A:
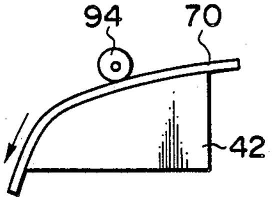
FIGS. 24A to 24C are side views showing three modifications of the ribbon guide shown in FIGS. 18 to 23.
Figure 24B:
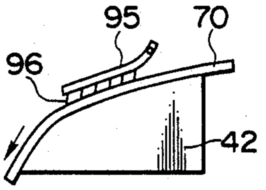

When ribbon guide 42 can have the structure shown in FIG. 10A, FIG. 10B, or FIG. 10C. When guide 42 having the structure of FIG. 10A is used as a return electrode, ribbon guide 42 can be used in combination with roller 94, as is shown in FIG. 24A, leaf spring 95 having conductive fabric filaments 96, as is shown in FIG. 24B, or leaf spring 95 made of electrically conductive material. It is preferable that roller 9 is made of electrically conductive material. Roller 94, leaf spring 95 with filaments 96, and leaf spring 9 keep ribbon 70 in contact with the sloping surface of ribbon guide 42.

Roller 15 shown in FIGS. 21 and 22, and rollers 92 and 93 shown in FIG. 23 can have the structure shown in FIGS. 11A, 11B.

Figure 25:
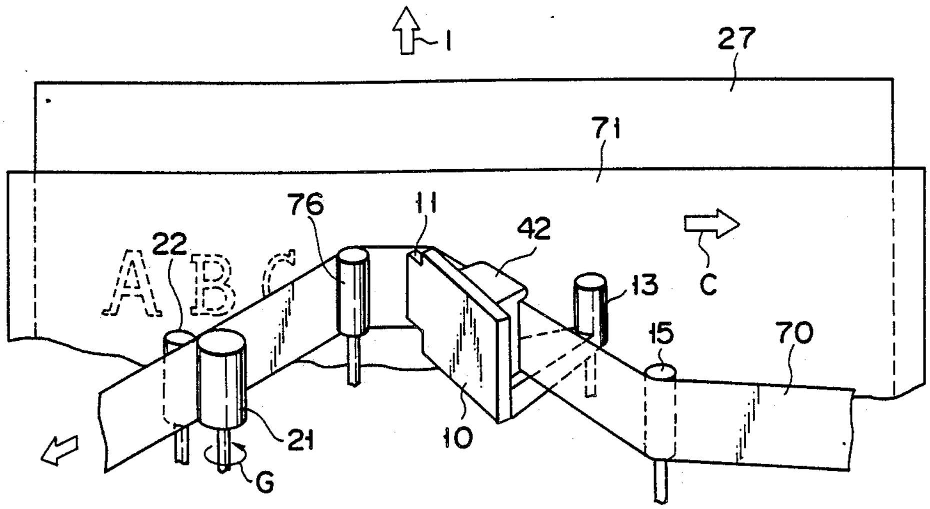

FIG. 25 illustrates another embodiment of the present invention, i.e., a serial thermal printer, in which use is made of data-printing ribbon 71 slightly broader than recording paper 27 wrapped around a platen (not shown). In this printer, heat-generating ribbon 70 is fed in the same way as in the embodiment shown in FIG. 21. Every time the recording head 11 records one line of data on paper 27, recording paper 27 and data-printing ribbon 71 are fed by predetermined distances in the direction of arrow I. Ribbon 71 can either be taken up around a reel, or fed together with paper 27 as the platen is rotated. When ribbon 71 is taken up around the reel, it can be fed less than recording paper 27, thereby to reduce its consumption. Further, as in the embodiments of FIGS. 21, 22 and 23, the diameter of drive roller 21 or the rotational speed thereof can be reduced, thereby to decrease the consumption of heat-generating ribbon 70. The printer shown in FIG. 25 is advantageous in that fewer parts are mounted on carriage 23 (FIG. 2), and carriage 23 can, therefore, be moved faster. Hence, this printer is suitable as a high-speed printer.

In any embodiment described above, measures are taken, thereby return-current paths are reliably provided in ink ribbon 16 or in heat-generating ribbon 70, and thus preventing ribbon 16 or 70 from being cut. Therefore, relatively great data currents can be supplied from recording head 11 to ribbon 16 or 70. Nonetheless when such great currents are continuously supplied to the ribbon for a long time, so as to print images on recording paper 27, that portion of the ribbon which contacts the return electrode is heated, though the return-current paths have been formed within the ribbon. When this portion of the ribbon is heated to an excessively high temperature, the solid in layer is softened, and more ink dots than necessary are formed on paper 27, resulting in "fogging", and thus degrading the printing quality.

FIGS. 26 to 31 show further embodiments of this invention, each having a mechanism for cooling the ink ribbon, thereby to print data in high quality.

Figure 26:
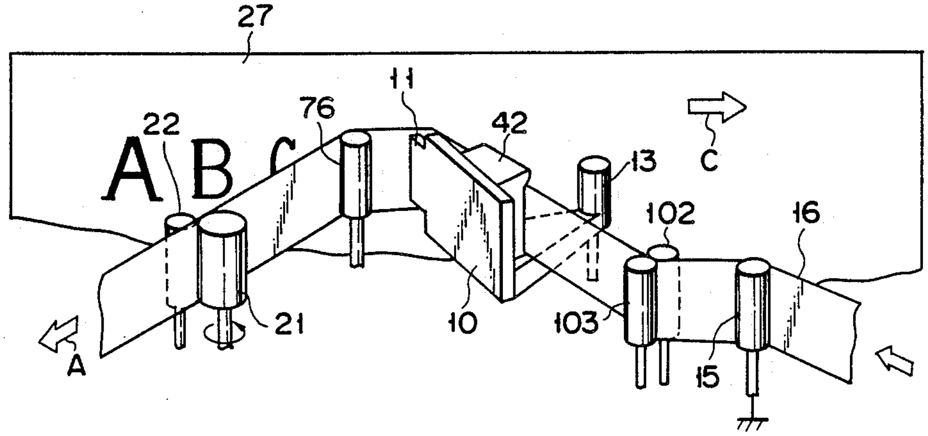

The serial thermal printer shown in FIG. 26 has a pair of cooling rollers 102 and 103 arranged in the passage of ink ribbon 16 and located between recording head 11 and return electrode 15. These rollers 102 and 103 pinch ink ribbon 16 during the data-recording operation, and are rotated as ribbon 16 is fed toward recording head 11. When the data-recording operation ends or is stopped, rollers 102 and 103 are moved away from ink ribbon 16.

Cooling rollers 102 and 103 are made of a metal having a high thermal conductivity, such as copper, aluminum or molybdenum. Alternatively, they can be made of ceramics such as $Al_2O_3$. They should be as large as possible, so as to absorb much heat. It is required that their length be greater than the width of ink ribbon 16.

The used portion of ribbon 16 is pinched between rollers 21 and 22. Roller 21 is rotated by a drive means (not shown) in the direction of the arrow shown in FIG. 26, thereby feeding ribbon 16 in the direction of arrow A. In the meantime, head 11 transfers ink dots from ribbon 16 onto recording paper 27. The data currents supplied from head 11 to base film 32 of ribbon 16 during the data-recording operation flow into return electrode 15 through conductive layer 33 of ribbon 16. These currents flows to electrode 15 via the substantially entire portion of base film 32, which contacts return electrode 15. Therefore, the current density is this portion of base film 32 is low. However, this current density increases in proportion to the number of the data-recording electrodes of head 11, which are energized simultaneously. This, much head is generated in said portion of film 32 in some cases. This heat is transferred from base film 32 to the corresponding portion of solid ink layer 34 via that portion of conductive layer 33 which contacts the heat-generating portion of base film 32. Consequently, this portion of ink layer 34 is softened or melted, and becomes viscous. If ink layer 34 is still viscous when it reaches head 11, it sticks onto recording paper 27. In other words, more ink dots than necessary are formed on paper 27, with the unnecessary ink dots bridging the necessary ones.

The inventors hereof operated the printer identical with the printer shown in FIG. 26, except that cooling rollers 102 were removed, changing the distance between head 11 and return electrode 15 to various values, and also changing the data-recording speed to various values. The results of this experiment were: the longer the distance between head 1 and electrode 15, and the higher the data-recording speed, the greater the possibility of degrading the printing quality.

The inventors conducted the same experiment on the serial thermal printer identical to the one shown in FIG. 26, wherein both cooling rollers 102 and 103 are made of copper. The results were: the possibility of degrading the printing quality was reduced considerably. For example, when data was recorded at the speed of 6 inch/sec, that portion of the ribbon contacting return electrode was heated to about 50° C., while the temperature in the room where the experiment was performed was 20° C. This portion of the ribbon was cooled to about 25° C. when it was reaching head 11. (When both cooling rollers were not used, the portion of the ribbon was cooled to not less than 40° C. when it was reaching head 11.) These temperatures were measured by means of thermography. During the experiment, it was observed that the solid ink layer softened due to the heat generated at the return electrode was not viscous enough to stick onto cooling roller 102.

Figure 24C:
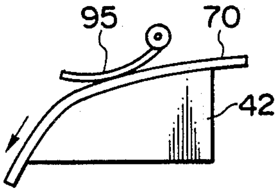

Either cooling roller 102 or 103 can be used as a return electrode. If this is the case, it is desirable that the roller be made of material exhibiting great thermal conductivity and great electrical conductivity, and be as large as possible to have a sufficient heat capacity. Further, ribbon guide 42 can be used as a return electrode, in which case cooling roller 94 and ribbon guide 42 pinch ink ribbon 16 as is illustrated in FIG. 24, so that roller 94 absorbs heat from ribbon 16.

Figure 27:
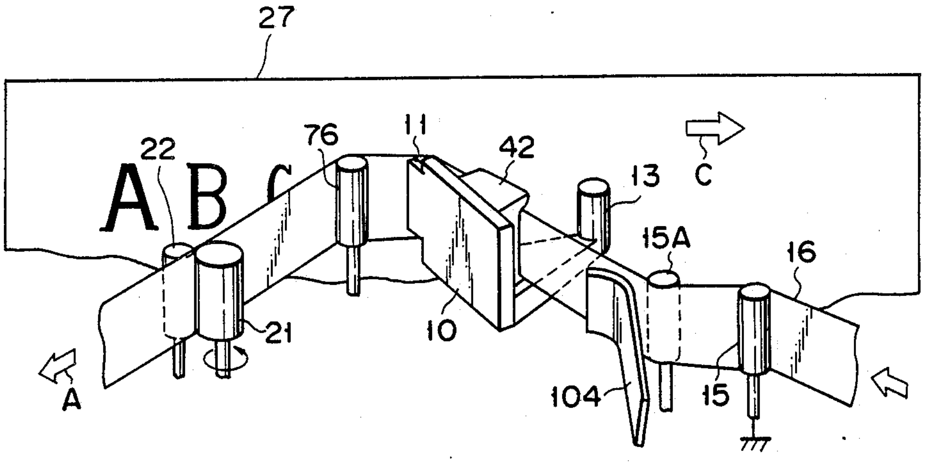

The serial thermal printer shown in FIG. 27 has leaf spring 104 for cooling ink ribbon 16. Spring 104 is fixed at one end. The other end of this spring 104 is curved, and is held in contact with the base film of ink ribbon 16 by means of an urging mechanism (not shown) during the data-recording operation. The heat generated in ribbon at return electrode 15 is transmitted to leaf spring 104, whereby ink ribbon 16 is cooled. Spring 104 is made of material exhibiting high thermal conductivity, such as copper. To dissipate the heat effectively, leaf spring 104 can have fins.

Figure 28:
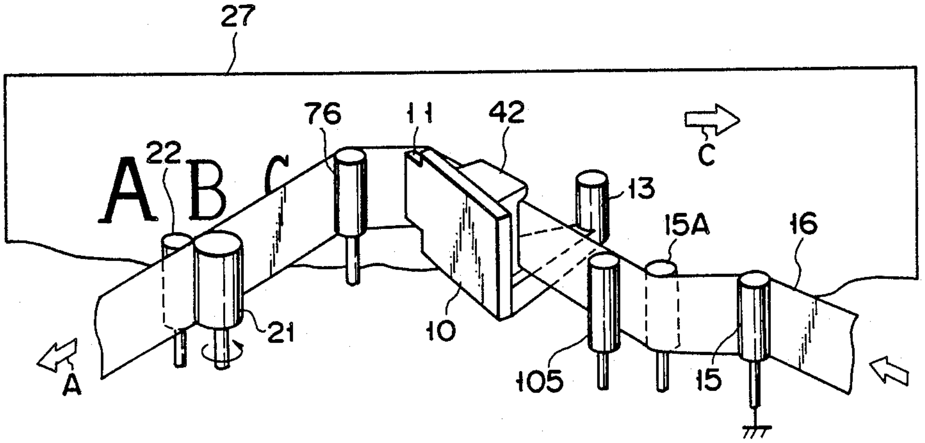

The serial thermal printer shown in FIG. 28 has liquid-applying roller 105 for cooling ink ribbon 16. Roller 105 is made of sintered porous metal. Roller 105 has an inlet port (not shown), and cooling liquid is introduced into roller 105 through this inlet port. The liquid is supplied to the circumference of roller 105 through capillaries of roller 105. The liquid is, preferably, a very volatile one, such as water or ethyl alcohol. When that portion of ribbon 16 which has been heated at return electrode 15 reaches liquid-applying roller 105, the cooling liquid is coated on the base film of ribbon 16. As soon as the liquid is coated the base film, it evaporates, thus cooling ink ribbon 16 efficiently. The cooling liquid serves to stabilize the mutual contact of ink ribbon 16 and roller 105.

A layer of foamed rubber can be bonded to the free end of leaf spring 104 used in the printer illustrated in FIG. 27. In this case, cooling liquid is applied to the foamed rubber layer, all the time the printer is operated. The liquid not only cools ink ribbon 16, but also stabilize the mutual contact of ink ribbon 16 and leaf spring 104.

Figure 29:
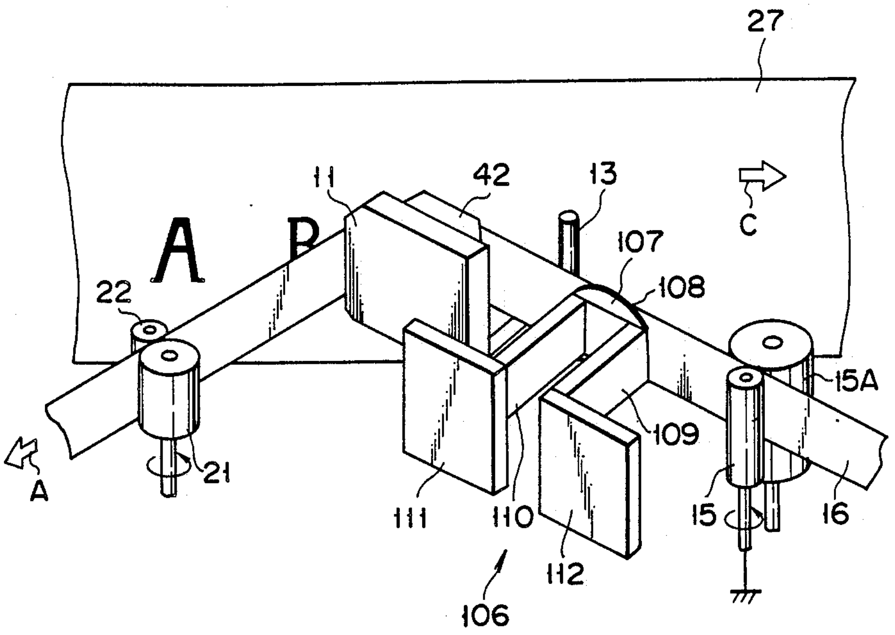

The serial thermal printer shown in FIG. 29 is provided with Peltier element 106 which is used as a cooling means. As is shown in this figure, element 106 comprises heat-absorbing plate 107, thin film 108 coated on plate 107, n-type semiconductor 109 connected to plate 107, p-type semiconductor 110 coupled to plate 107, heat-radiating plate 111 connected to p-type semiconductor 110, and heat-radiating plate 112 connected to n-type semiconductor 109. Heat-absorbing plate 107 contacts ink ribbon 16, but is electrically insulated from ribbon 16 since thin film 108 is electrically insulative, though it is thermally conductive. An operating current is supplied to element 106. This current flows from plate 112 to plate 111 via n-type semiconductor 109, plate 107, and p-type semiconductor 110. As the current flows from n-type semiconductor 109 to p-type semiconductor 110 through heat-absorbing plate 107, endothermic energy is generated at the interface between plate 107 and semiconductor 109 and also at the interface between plate 107 and semiconductor 110. As a result, plate 107 is cooled, and in turn cools ink ribbon 16.

As the current flows from plate 112 to n-type semiconductor 109, heat is generated at the interface between plate 112 and semiconductor 109. Similarly, as the current flows from p-type semiconductor 110 to plate 111, heat is generated at the interface between semiconductor 110 and plate 111. Nonetheless, the heat is effectively radiated from plates 111 and 112 which are sufficiently large. In order to achieve more effective heat radiation, plates 111 and 112 can be provided with fins.

Figure 30A:
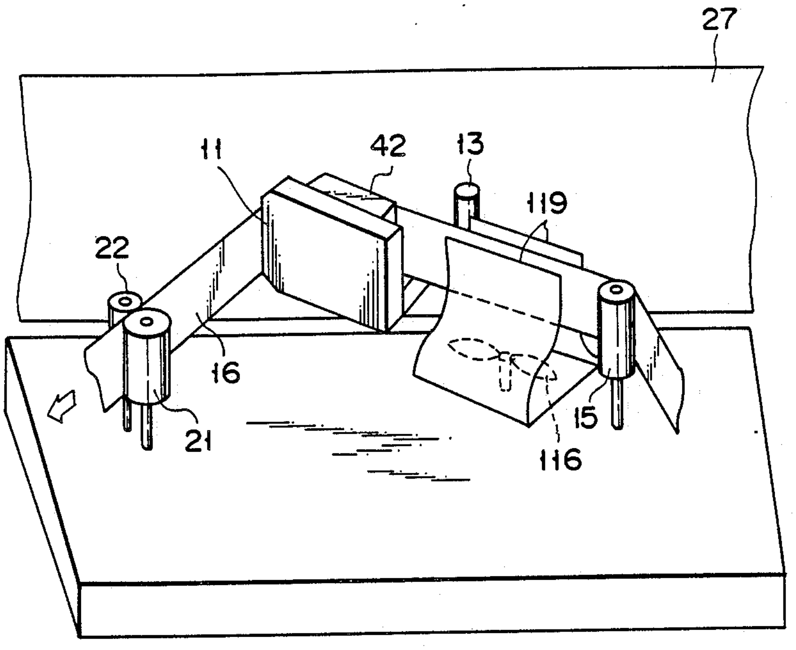
Figure 30B:
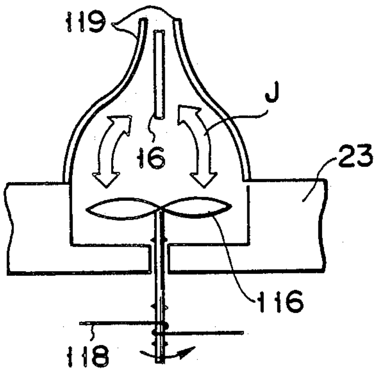
FIG. 30B is a cross-sectional view schematically showing the cooling means used in the printer shown in FIG. 30A.

The serial thermal printer shown in FIG. 30A has a ribbon-cooling means which is located between recording head 11 and return electrode 15 and does not contact ink ribbon 16. As is shown in FIG. 30B, this cooling means comprises fan 116 connected to a shaft. The shaft vertically extends through a hole cut in carriage 23. Wire 118 is wound one time around that portion of the shaft which protrudes downwardly from carriage 23, and is horizontally stretched, with both ends fastened to the frames of the printer. Therefore, when carriage 23 is moved to record data on paper 27, fan 116 is rotated, thereby applying air in the direction of arrow J. A pair of curved thin plates 119 are located parallel to that unused portion of ribbon 16 which extends between return electrode 15 and head 11. The upper end of the first thin plate face the base film of ribbon 16, whereas the upper end of the second thin plate faces solid ink layer of ribbon 16. The air supplied by fan 116 flows through the gap between the first thin plate and ribbon 16 and the gap between the second thin plate and ribbon 16, thus cooling ink ribbon 16.

Figure 31:
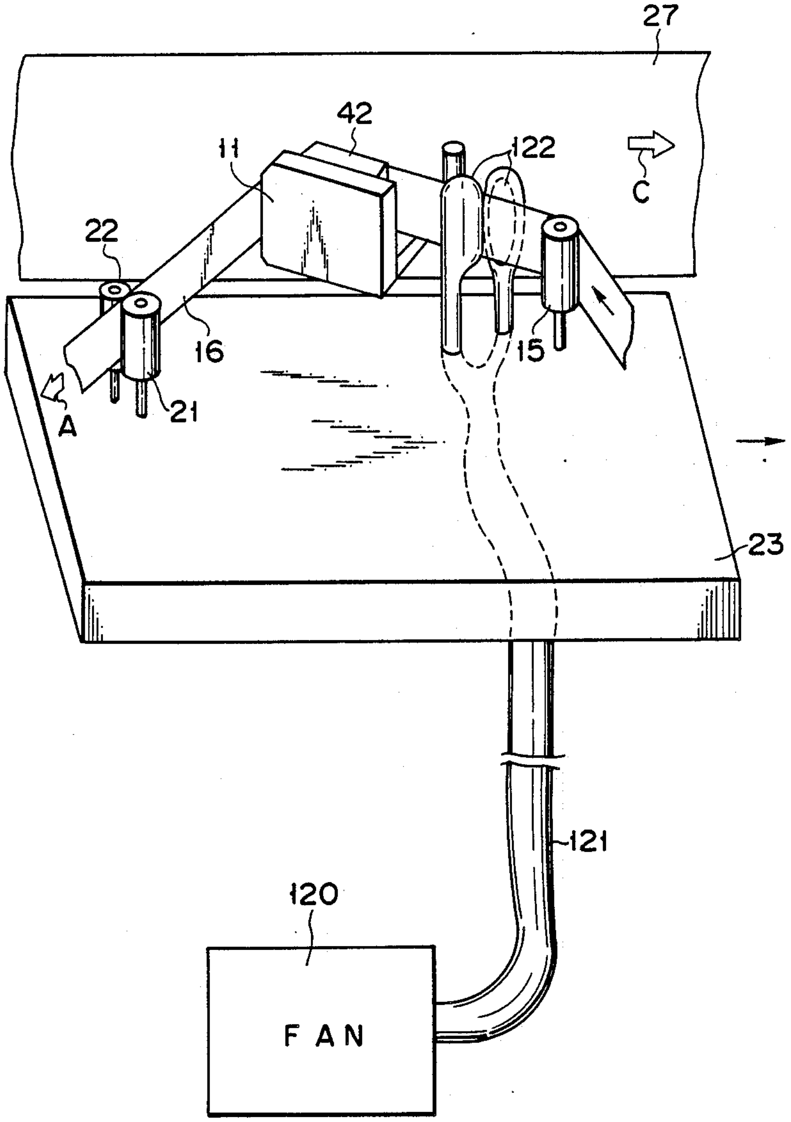

The serial thermal printer shown in FIG. 31 is provided a cooling means which does not contact ink ribbon 16, but can cool the ink ribbon. This cooling means comprises fan box 120 arranged within the housing of the printer, flexible tube 121 connected at one end to fan box 120, and forked air outlet port 122 coupled to the other end of flexible tube 121. The two sections of air outlet port 122 protrude upward from carriage 23 and oppose each other, with an unused portion of ribbon 16 located between them. When the fan contained in fan box 120 is rotated, air is supplied onto the base film and ink layer of ribbon 16 through flexible tube 121 and the two sections of air outlet port 122, thus cooling the unused portion of ink ribbon 16. Since air outlet port 122 is small, this cooling means is suitable in the case where the distance between head 11 and return electrode 15 is so short that no cooling rollers can be provided between head 11 and electrode 15.

The ribbon-cooling means, which have been described with reference to FIGS. 26 to 31, can be used in any possible combination. They can be provided within ribbon cassette 20 (FIG. 2), not on carriage 23.

Signal-generating circuit shown in FIG. 4, and various modifications of this circuit will now be explained with reference to FIG. 32 through FIG. 46.

Figure 32A:
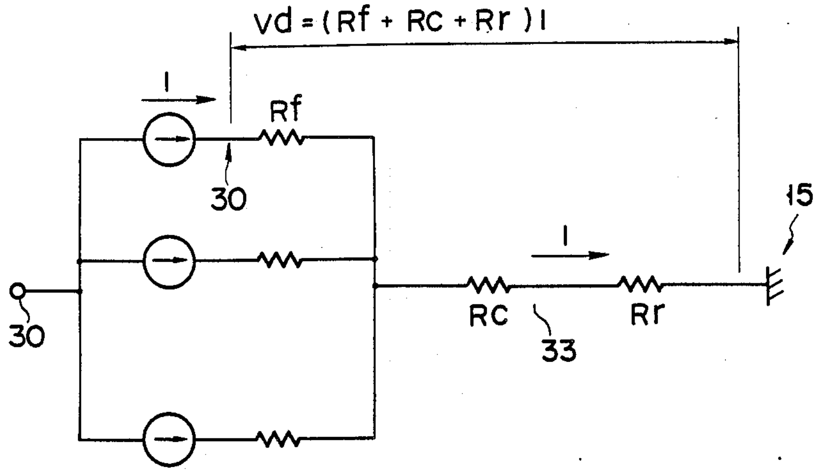
FIGS. 32A and 32B are equivalent circuit diagrams explaining how data currents flows from a recording head to a return electrode.
Figure 32B:
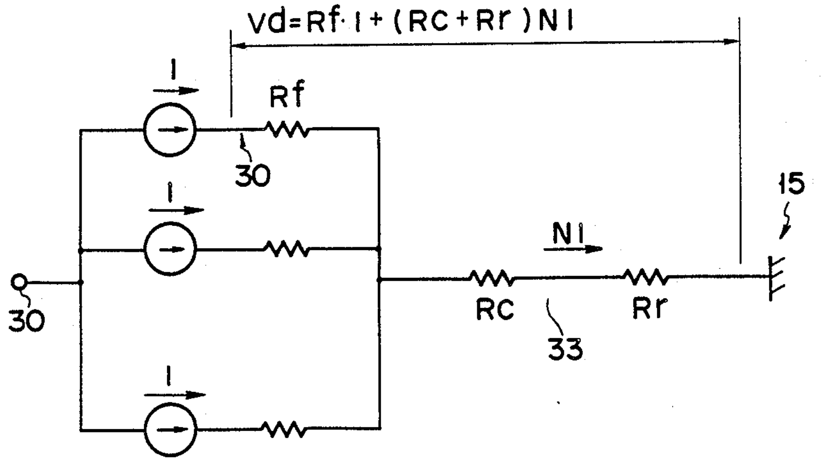

FIGS. 32A and 32B are equivalent circuit diagrams showing how data currents flow from data-recording electrodes 30 to return electrode 15. In these figures, Rf is the resistance between each electrode 30 and conductive layer 33 of ink ribbon 16; Rc is the resistance of conductive layer 33; and Rr is the resistance between conductive layer 33 and return electrode 15.

As is shown in FIG. 32A, data currents I flow from data-recording electrodes 30 into conductive layer 33, and farther flow through the entire cross section of layer 33 to return electrode 15. Resistance Rf is 100 to 400, whereas Rr is as low as a few ohms. Resistance Rc depends on the material of conductive layer 33 and the thickness thereof; it is several ohms to tens of ohms when layer 33 is made of aluminum and has a thickness of 0.05 to 0.1 $\mu$m.

Recording head 11 has tens of data-recording electrodes 30 arranged parallel in a line parallel to the paper-feeding direction if head 11 is a serial print head. If head 11 is a line print head, it has hundreds of data-recording electrodes 30 arranged parallel in a line extending at right angles to the paper-feeding direction. In either case, a plurality of data-recording electrodes contact ink ribbon 16 at their tips. When only one of these electrodes supplies data current I to conductive layer 33 of ribbon 16 as is shown in FIG. 32A, voltage drop Vd occurring in resistive ink ribbon 16, i.e., the difference between the potential of electrodes 30 and the potential of return electrode 15, is (Rf +Rc +Rr) I. When N electrodes 30 simultaneously supply data current I, which has been supplied to electrodes 30 from a constant current circuit, to conductive layer 33 as is shown in FIG. 32B, voltage drop Vd is Rf·I+(Rc+Rr) N·I.

In order to record data at high speed, e.g., 100 cps, it is necessary to supply at least 50 mA to each data-recording electrode 30. Let us assume that Rf=250 Ω, Rc=15 Ω, Rr=1 Ω, and N=40. Then, maximum voltage drop Vdmax, which occurs when 50 mA is supplied to all electrodes 30, will be:

$$\begin{aligned} Vd\text{max} &= (250\ \Omega \times 0.05\ \text{mA}) + \\ &\quad [(15 + 1)\Omega \times 40 \times 0.05\ \text{mA}] \\ &= 44.5\ \text{V} \end{aligned}$$

Hence, the power-supply voltage for the constant current circuit must be equal to or higher than 45 V. Needless to way, when data current I is greater than 50 mA, and head 11 has more than 40 data-recording electrodes, much more power-supply voltage is required. Furthermore, when data current I is supplied from all electrodes 30 to ink ribbon 16, heat is generated in those portions of ribbon 16 which are aligned in a line, and ribbon 16 may be cut even if return electrode 15 contacts an unused portion of ribbon 16.

According to the present invention, the following measures are taken to reduce the possibility that ribbon 16 is cut. Electrodes 30 are divided into a plurality of groups. When most of electrodes 30 need to be driven, those of one group are driven at a time, and those of another group are driven at a different time. Examples of this method will be described.

Figure 33A:
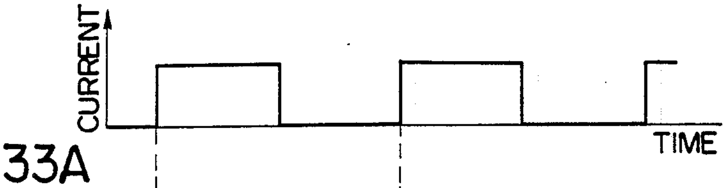
FIGS. 33A and 33B show the waveforms of the current pulses supplied from the recording head to the ink ribbon in an electrothermal printer according to the present invention.
Figure 33B:
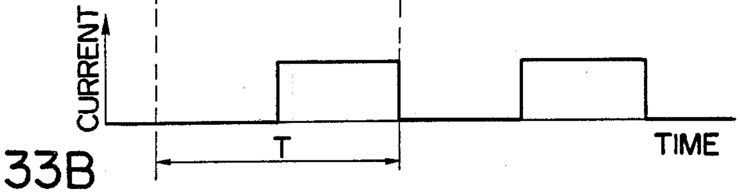

FIGS. 33A and 33B are diagrams explaining a first example of the method for driving data-recording electrodes 30. In this example, electrodes 30 are divided into two groups, the first group consisting of the odd-numbered electrodes, and the second group consisting of the even-numbered electrodes. As is shown in FIG. 33A, data current I is supplied to odd-numbered electrodes 30 during the first half of every data-recording period T. As is illustrated in FIG. 33B, data current I is supplied to even-numbered electrode 30 during the second half of every data-recording period T.

As may be understood from the equivalent circuit diagram shown in FIG. 32B, when data current I is supplied to N data-recording electrodes 30 at the same time, voltage drop Vd between electrodes 30 and return electrode 15 is: (Rf)+(Rc+Rr) NI. In contrast, when the method explained with reference to FIGS. 33A and 33B is used, voltage drop Vd is: Rf I+(Rc+Rr) NI/2.

More specifically, assuming Rf=250 Ω, Rc=15 Ω, Rr=1 Ω, and N=40, Vdmax will be:

$$\begin{aligned} Vd\text{max} &= (250\ \Omega \times 0.05\ \text{mA}) + \\ &\quad [(15 + 1)\Omega \times 40 \times 0.05\ \text{mA}]/2 \\ &= 28.5\ \text{V} \end{aligned}$$

Obviously, this voltage drop is far less than Vdmax (=45.5 V) which occurs when all electrodes 30 are simultaneously driven. Hence, it is sufficient to apply a power-supply voltage of about 30 V to the constant current circuit when 20 odd-numbered electrodes 30 are driven during the first half of every period T, and 20 even-numbered electrodes 30 are driven in the second half of each period T, as is illustrated in FIGS. 33A and 33B.

When data current I is supplied to each data-recording electrode 30 for only T/2 as is shown in FIGS. 33A and 33B, the Joule heat generated in that portion of ribbon 16 which contacts this electrode 30 is less than the Joule heat which would be generated in the same portion of ribbon 16 it current I were supplied to electrode 30 for T. Hence, in the method shown in FIGS. 33A and 33B, data current I must be greater so as to generate Joule heat in the same amount as in the case where current I is supplied to each electrode 30 for period T. Nevertheless, it suffices to increase current I a little since Joule heat is proportionate to the square of the current supplied to electrode 30. Therefore, the power-supply voltage need not be increased very much.

In the method shown in FIG. 33A and 33B, data-recording electrodes 30 are divided into two groups. Instead, electrodes 30 can be divided three or more groups, and data current I can be applied to the electrodes of one group at a time, and to those of another group at a different time. Then, the power-supply voltage required for the constant current circuit can be more reduced.

Figure 34A:
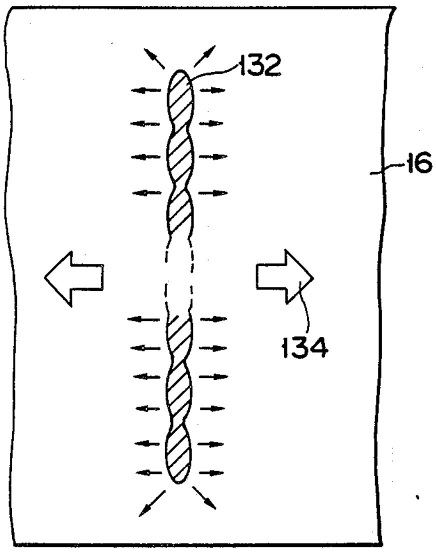
FIGS. 34A and 34B are diagrams showing those portions of the ink ribbon where heat is generated when two types of electrothermal printers are operated.
Figure 34B:
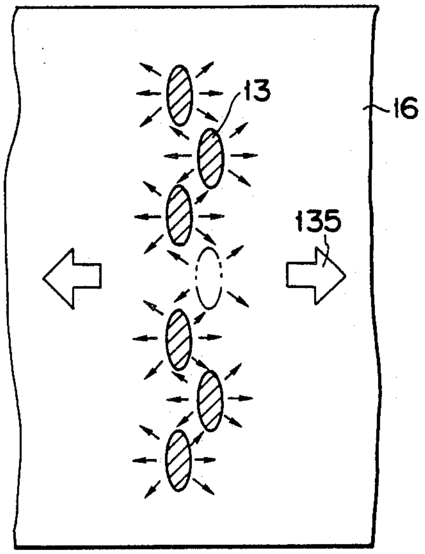

It will now be explained why the method described with reference to FIGS. 33A and 33B decreases the possibility that ribbon 16 is cut. As has been stated, the heat generated in resistive base film 32 softens or melt solid ink layer 34, whereby data is recorded on paper 27. If this heat is excessively great, base film 32 is heated to a temperature near its melting point, in which case ink ribbon 16 may be cut due to the tension applied on it. When all data-recording electrodes 30 are driven at the same time, heat is generated in those portions of base film 32 which are aligned in a straight line extending to the direction in which tension 134 is executed on ribbon 16, as is illustrated in FIG. 34A. In this condition, ink ribbon 16 is very likely to be cut. In the method described above, odd-numbered electrodes 30 are driven in the first half of each data-recording period T, and even-numbered electrodes 30 are driven in the second half of this period T. As a result, heat is generated in those portions of base film 32 which are staggered as is shown in FIG. 34B. Since the heated portions are separated form one another, unlike in the case where all electrodes 30 are simultaneously driven, the possibility that ribbon 16 is cut by tension 135 decreases.

Other methods of driving data-recording electrodes 30 will be explained, with reference to FIGS. 35A and 35B, 36A and 36B, and FIGS. 37A and 37B. These methods are identical to the method shown in FIGS. 33A and 33B in that electrodes 30 are divided into two groups, but is different in that the electrodes of the first group and those of the second group are alternately driven, each for a period shorter than T/2. These methods can print data, consuming the same power as is used in the method shown in FIG. 33A and 33B.

In the method shown in FIGS. 35A and 35B, current pulses having a width shorter than T/2 are supplied to the odd-numbered electrodes 30, where current pulses having the same width and opposite in phase to those supplied to odd-numbered electrodes are supplied to the even-numbered electrodes 30. As a result, a straight line, which is substantially parallel to the direction in which tips of electrodes 30 are aligned, can be printed on recording paper 27. In view of this, the method is advantageous over the method shown in FIGS. 33A and 33B which results in a zigzag line printed on paper 27 as can be understood from FIG. 34B. But this method is inferior to the method shown in FIGS. 33A and 33B in that heat is accumulated in ink ribbon 16 if head 11 is continuously used for a long time, since many current pulses are supplied to electrodes 30 within each period T. Therefore, it would be advisable that method shown in FIGS. 33A and 33B be employed to record image data of high density such as so-called "all-mark pattern", and the method shown in FIGS. 35A and 35B be used to print straight lines extending parallel to the line in which the tips of electrodes 30 are aligned.

When the method shown in FIGS. 35A and 35B is used, thereby to print a straight line, the temperature of ink ribbon 16 does not rise sufficiently fast as is possible with the method shown in FIGS. 33A and 33B, and during the first phase of each period T, no ink dots may be formed on paper 27. In order to avoid this phenomenon, current pulse can be supplied to all electrodes 30 for period Ts (hereinafter referred to as "pre-heating period") which precedes each data-recording period T, and also for period Te (hereinafter referred to as "heat-retaining period") which follow each period T, as is illustrated in FIGS. 36A and 36B. This method, shown in FIGS. 36A and 36B, makes it possible to reliably print a straight line on paper 27.

The method shown in FIGS. 36A and 36B, however, has a drawback. When this method is used, the voltage drop occurring in ink ribbon 16 temporarily increases during the pre-heating period Ts and during the heat-retaining period Te. In case the voltage drop exceeds the powersupply voltage to head 11, head 11 can no longer perform its function. In order to prevent such an excessive voltage drop, the method shown in FIGS. 37A and 37B can be employed in which the current pulse supplied to all electrodes 30 during the preheating period Ts and the head-retaining period Te is less than data current I. This method serves to prevent an excessive drop voltage. and can yet help to maintain ribbon 1 at a sufficiently high temperature.

FIGS. 38A and 38B illustrate another method of driving data-recording electrodes 30. This method is similar to that one shown in FIGS. 33A and 33B, but the current pulse supplied to the odd-numbered electrodes and the current pulse supplied to the even-numbered electrodes are longer than T/2, and thus overlap each other in phase. When recording head 11 is driven by this method, it can print a all-mark pattern in a sufficient density; whereas it cannot do so when it is driven by the method shown in FIGS. 33A and 33B unless the pulses supplied to the two groups of electrodes 30 have a current value greater than that shown in FIGS. 33A and 33B.

FIGS. 39A and 39B illustrate another method of driving data-recording electrodes 30, which is identical to the method shown in FIGS. 38A and 38B, except that the overlapping portions of the two current pulses supplied to the two groups of electrodes 30 have less current value than those of the two current pulses used in the method of FIGS. 38A and 38B. The method shown in FIGS. 39A and 39B can print a all-mark pattern in a sufficient density by adjusting the period during which the two current pulses overlap.

The various methods of driving data-recording electrodes 30 of recording head 11, which have been described with references to FIGS. 33A and 33B, FIGS. 35A and 35B, FIGS. 36A and 36B, FIGS. 38A and 38B, and FIGS. 39A and 39B, are classified as microcontrol of heat, which comprises the step of controlling the width and phase of the current pulse supplied to each electrode 30. It should be noted that there is another type of heat-controlling method, generally known as a micro-control, which comprises the step of changing the current supplied to all electrodes 30 in order to compensate the variation of the ambient temperature and/or the temperature of head 11.

The micro-control of heat will be explained in generator detail, with reference to FIGS. 40, FIGS. 41A to 41D, and FIGS. 42A to 42D.

As is shown in FIG. 40, the width and phase of the current pulse corresponding to specified pixel 141 are determined from the position of this pixel 141 with respect to eight neighboring pixels 142, which are arranged, together with specified pixel 141, in $3 \times 3$ matrix pattern, as is shown in FIG. 40. Then, the width and phase of the current pulse corresponding to the pixel next to specified pixel 141 with respect to the main scanning direction, are determined from the position of this pixel with respect to the other eight neighboring pixels. The width and phase of the current pulse corresponding to any other pixel shown in FIG. 40 are determined in the same way. In other words, the micro-control of head is achieved by selecting one of various predetermined $3 \times 3$ pixel-matrix patterns.

Figure 41A:
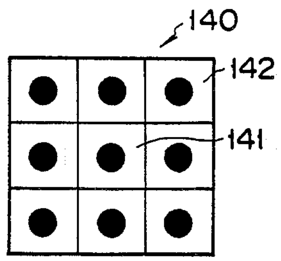
FIGS. 41A to 41D are diagrams showing various patterns formed of a specified pixel of an image data and eight other pixels of the image data.
Figure 42A:
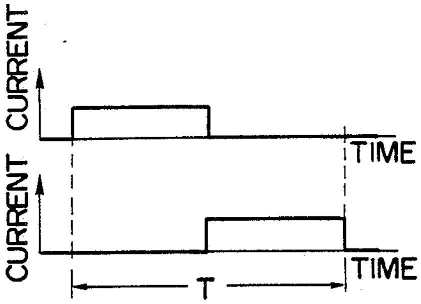
FIGS. 42A to 42D are diagrams showing the waveforms of the current pulses required for recording image data in the patterns shown in FIGS. 41A to 41D.
Figure 41B:
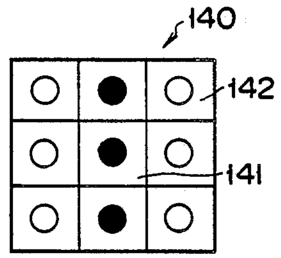
Figure 42B:
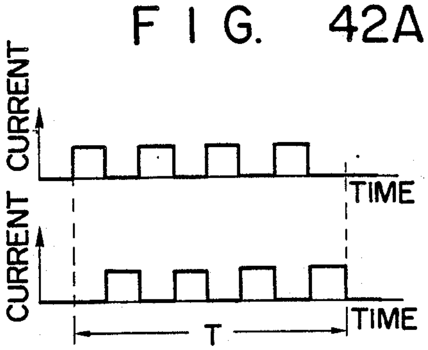
Figure 41C:
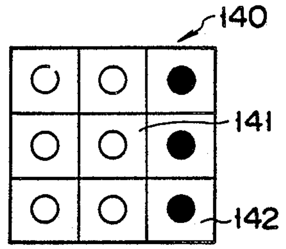
Figure 42C:
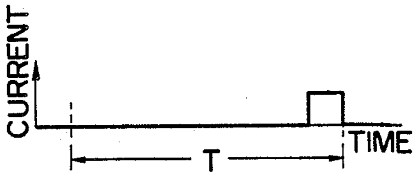

More specifically, when the selected pixel-matrix pattern is an all-mark pattern consisting of nine black dots as is shown in FIG. 41A, a current pulse having a width of T/2, as is shown in FIG. 42A, is supplied to data-recording electrode 30 corresponding to specified pixel 141. The phase of this current pulse is selected in accordance with whether this data-recording electrode is odd-numbered or even-numbered. When the selected pixel-matrix pattern consists of three black dots aligned in the main scanning direction, as is shown in FIG. 41B, current pulses having such a short width as is shown in FIG. 42B is supplied to data-recording electrode 30 which corresponds to specified pixel 141. Further, when the selected pixel-matrix pattern consists of three black dots aligned in the main scanning direction, but specified pixel 141 is not a black dot, as is shown in FIG. 41C, a current pulse is supplied to electrode 30 corresponding to specified pixel 141 as is shown in FIG. 42C, thereby to preheating this data-recording electrode 30.

Figure 41D:
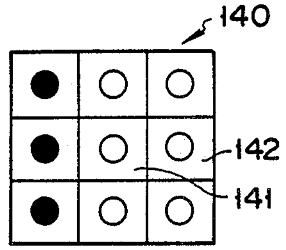
Figure 42D:
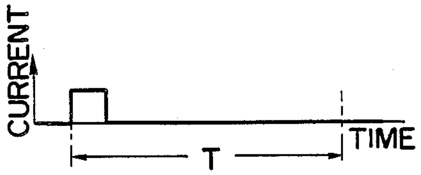

Similarly, when the selected pixel-matrix pattern consists of three black dots aligned in the main scanning line, but specified pixel 141 is not a black dot, as is shown in FIG. 41D, a current pulse is supplied to electrode corresponding to specified pixel 141 as is shown in FIG. 42D, thereby to maintain ink ribbon 16 at a sufficiently high temperature. Neither such a preheating current pulse (FIG. 42C) nor such a heat-retaining current pulse (FIG. 42D) is supplied to electrode 30 corresponding to specified pixel 141 when a signal is supplied to this data-recording electrode 30. Needless to say, either current pulse is not supplied to this electrode 30 when a mark signal is supplied to this electrode 30.

Figure 43A:
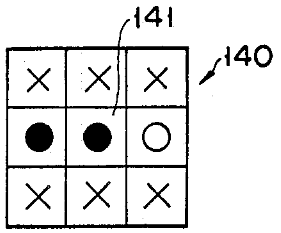
FIGS. 43A to 43D are diagrams showing various oneline patterns formed of a specified pixel of image data and two other pixel of the image data.
Figure 44A:
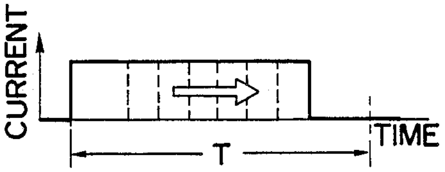
FIGS. 44A to 44C are waveform diagrams showing the timing of applying current pulses to the recording head in order to record one-line patterns shown in FIGS. 43A to 43D.
Figure 43B:
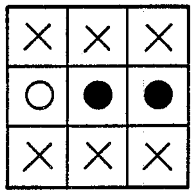
Figure 44B:
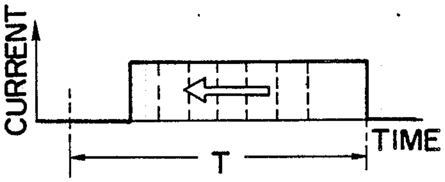
Figure 43C:
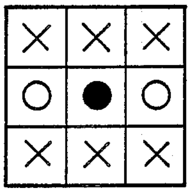
Figure 44C:
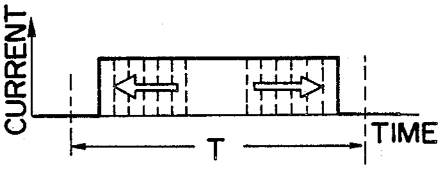
Figure 43D:
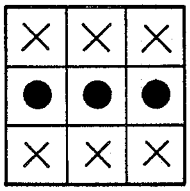

In order to maintain ink ribbon 16 at a sufficiently high temperature, the width of a current pulse must be inversely proportional to the number of black dots included in the 3×3 matrix pattern, and the phase of the current pulse must be determined in accordance with whether or not the three pixels aligned in the subscanning direction (FIG. 40) are black dots or white dots. More specifically, when specified pixel 141 and the pixel preceding specified pixel 141 and aligned therewith in the sub-scanning direction are black dots as is shown in FIG. 43A, a current pulse having a width determined by the fact that two pixels including the specified one 141 are aligned in the sub-scanning direction is supplied to electrode 30 corresponding to specified pixel 141, such that the leading edge of this pulse coincides with the starting point of data-recording period T, as is illustrated in FIG. 44A. Conversely, when pixel 141 and the pixel following pixel 141 and aligned therewith in the sub-scanning direction are black dots as is shown in FIG. 43B, a current pulse having the same width as is shown in FIG. 44A is supplied to electrode 30 corresponding to specified pixel 141, such that the trailing edge of this pulse coincides with the ending point of data-recording period T. Further, when specified pixel is a black dot and the two pixels preceding and following pixel 141, respectively, and both aligned with pixel 141 in the sub-scanning direction are white dots as is shown in FIG. 43C, or are black dots as is shown in FIG. 43D, a current pulse having a width determined by this fact is supplied to electrode 30 corresponding to specified pixel 141, such that the center of this pulse coincides with the center point of data-recording period T, as is illustrated in FIG. 44C.

In FIGS. 43A to 43D, the pixels identified by mark "X" correspond either to mark signals or to space signals. These pixels do not influence the phase of the current pulse supplied to data-recording electrode 30 corresponding to specified pixel 141 at all.

According to the present invention, the temperature of ink ribbon 16 is maintained at an appropriate value by supplying a current pulse having appropriate width and phase to the data-recording electrode 30 corresponding to specified pixel 141, as has been described above. Therefore, ink ribbon 16 is not heated excessively, the constant current circuit does not require a high power-supply voltage, and the possibility that ribbon 16 is cut is reduced.

In the various method of driving electrodes 30, which have been described above, the electrodes 30 of recording head 11 are divided into two groups, the first group consisting of the odd-numbered electrodes, and the second group consisting of the even-numbered electrodes. Instead, the first group can consists of the first N/2 electrodes, and the second group can consists of the remaining N/2 electrodes. Alternatively, the first group can be comprised of odd-numbered sub-groups each consisting of several electrodes 30, and the second group can be formed of even-numbered sub-groups each consisting of several electrodes 30. Still further, data-recording electrodes 30 can be divided into three or more groups.

When the above-described various method of driving electrodes 30 are employed, it is possible to supply no current pulses to many electrodes 30 at the same time when these electrodes are used to print ink dots on paper 27. Hence, the amount of the current flowing through ink ribbon 16 is controlled, and the voltage drop across ribbon 16 is reduced. As a result, the power-supply voltage of the constance current circuit is low. In addition, since those portions of ink ribbon 16, in which heat is generated, are sparsely located, the possibility of the cutting of ribbon 16 is minimized.

Figure 45A:
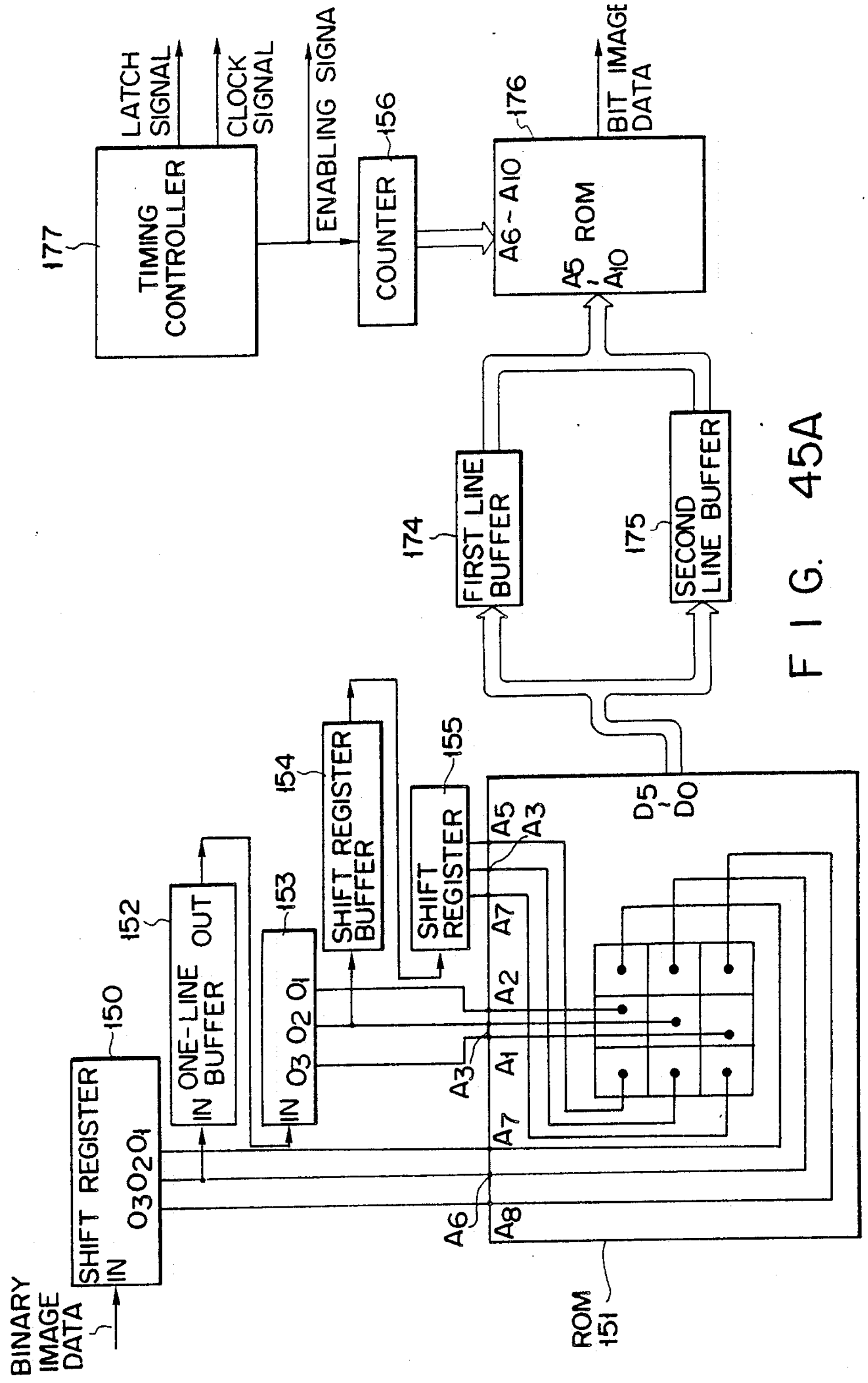
FIGS. 45A and 45B are diagrams illustrating one example of a circuit for generating current pulses, which is used in a resistance thermal printer according to the present invention.
Figure 45B:
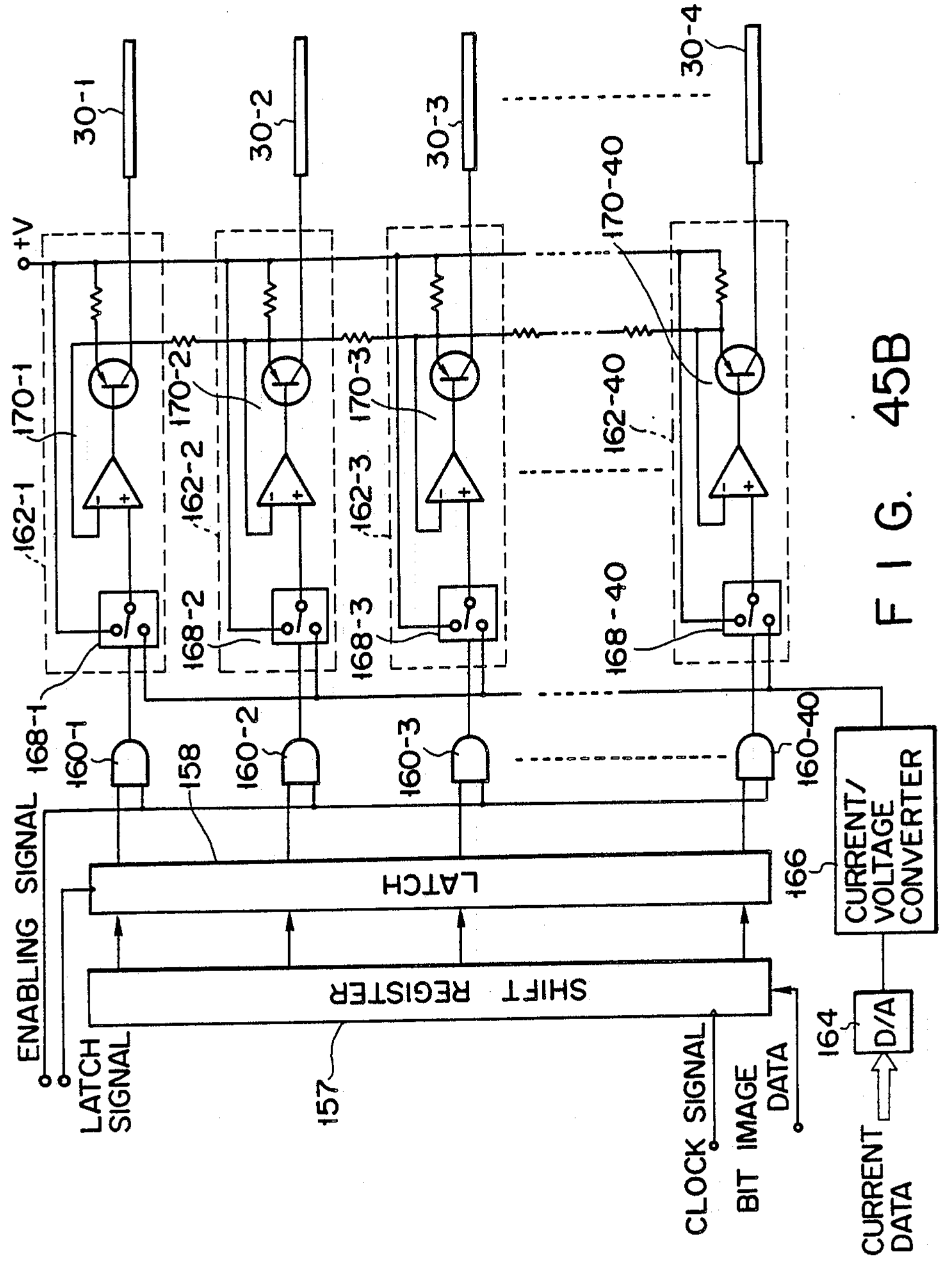
Figure 46:
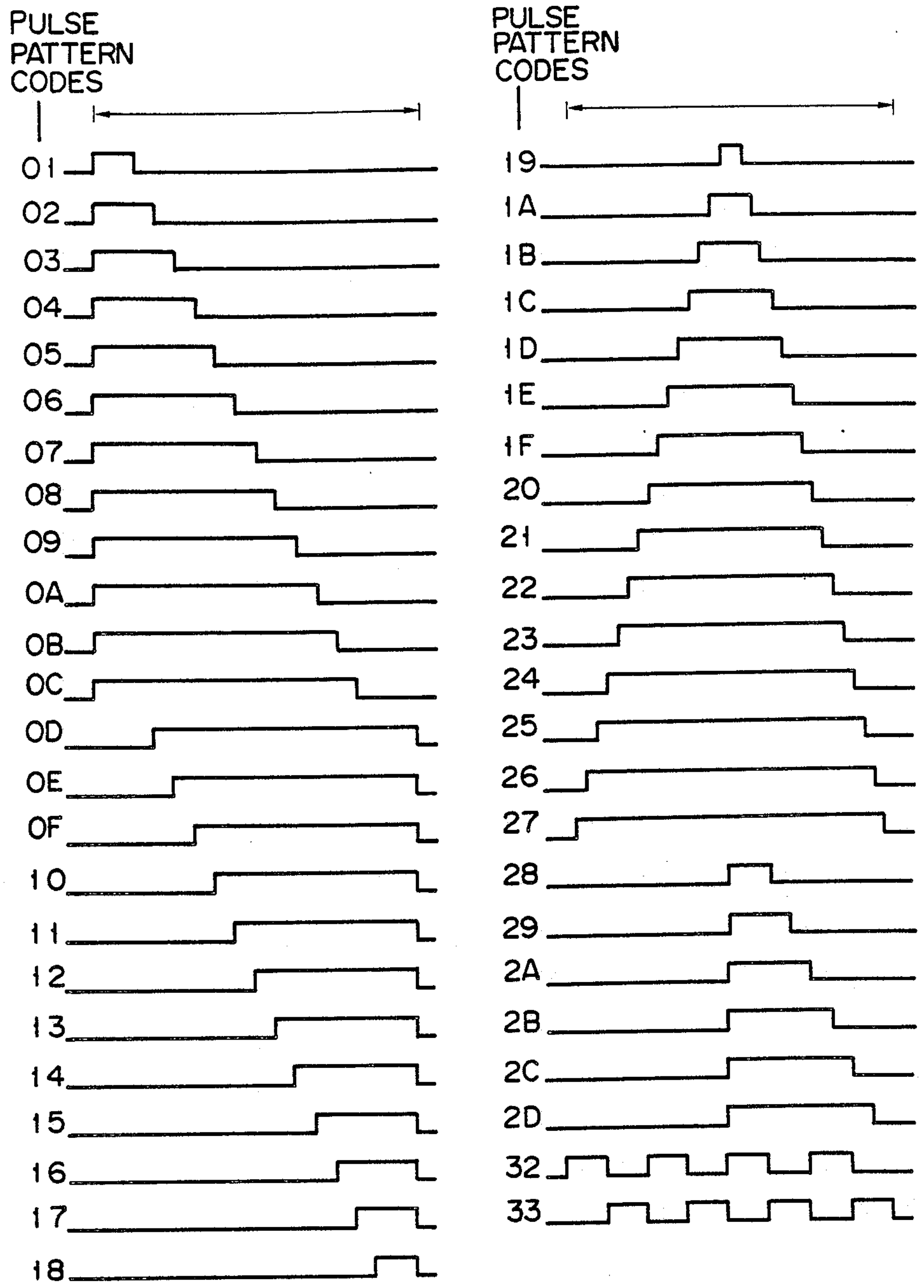
FIG. 46 shows the waveforms of the current pulse codes stored in the ROM shown in FIG. 45A.

FIGS. 45A and 45B are diagrams showing an example of a circuit for generating current pluses for driving data-recording electrodes 30 by one of the methods described above. FIGS. 46 shows the waveforms of the current pulse codes stored in a ROM shown in FIG. 45A. With reference to these figures, the method of driving electrodes 30 will be explained in greater detail.

As is shown in FIG. 45A, image data to be recorded on paper 27 is supplied, in the form of serial binary data, from a data processor (not shown) to 3-bit shift register 150. This image data is supplied, as address data, from shift register 150 to ROM 151 which stores the code data representing various ways of applying a current pulse to the electrode 30 corresponding to specified pixel 141 (FIG. 40). (These ways of applying the current pulse will be hereinafter referred to as "pulse-supplying patterns".) The second bit of the 3-bit image data stored in shift register 150 is supplied to one-line (1 bit×40) buffer 152. As other items of 3-bit image data are sequentially supplied to 3-bit shift register 150, and the second bit of each 3-bit image data item is supplied to one-line buffer 152. When the forty-first bit is input to buffer 152, the second-bit data (40 bits) is supplied from buffer 152 to 3-bit shift register 153. The second-bit data is then supplied from shift register 152 to ROM 151, in the form of parallel 3-bit data items and as address data. The second bit of each 3-bit address data output by shift register 153 is supplied to one-line (1 bit×40) buffer 154. This bit is the address of specified pixel 141 shown in FIG. 40. When the forty-first bit is input to buffer 154, the second-bit data (40 bits) is supplied from buffer 154 to 3-bit shift register 155. The second-bit data is supplied from shift register 155 to ROM 151, in the form of parallel 3-bit data items and as address data.

FIG. 46 schematically represents the various pulse-supplying pattern codes which are stored in ROM 151, in the form of code data. When the three items address data output by shift registers 150, 153, and 155 are supplied to ROM 151, one of the pattern codes is accessed. More specifically, the address signal designating specified pixel 141 is input to terminal A0 of ROM 151, and the address signals designating the eight reference pixels 142 are input to terminals A1 to A8 of ROM 151. These nine address signals designate one of the pattern codes stored in ROM 151. The 6-bit code data representing the selected pattern code is output from ROM 151 and supplied to first 6 bit×40 line-buffer 174. Other 6-bit code data items are supplied from ROM 151 to first line-buffer 174 as other pattern codes are selected in accordance is 9-bit addresses are input to ROM 151. When 40 6-bit code data items have been input into first line-buffer 174, the next 40 code data items supplied from ROM 151 are input into second 6 bit×40 line-buffer 175. The 40 code data items, which correspond to a first line of data, are supplied from first line-buffer 174 to image data conversion ROM 176. Then, further 40 code data items supplied from ROM 151, which correspond to a third line of data, are input into first line-buffer 174. Meanwhile, the 40 code data items, which correspond to a second line of data, are supplied from second line-buffer 175 into ROM 176. Thereafter, other 40 code data items supplied from ROM 151, which correspond to a fourth line of data, are input into second-line buffer 175. Thus, as the contents of line-buffers 174 and 175 are updated in this way, lines of data are sequentially stored into ROM 176.

In the meantime, timing controller 177 generates timing signals which are used to divide data-recording period T into 32 segment periods. These timing signals are supplied to counter 156 and counted by this counter 156. The count value of counter 156 is supplied, as address data, to image data conversion ROM 176. Then, 40 bit image data items corresponding to the 40 code data items, which has been input from first line-buffer 174 into ROM 176 and correspond to the first line of data, are sequentially supplied from ROM 176 to 40-bit shift register 157 shown in FIG. 45B, in synchronism with clock signals output by timing controller 177.

More precisely, when pattern code 01 shown in FIG. 46 is input into ROM 176 via first line-buffer 174, bit image data item "1" is supplied to 40-bit shift register 157 in synchronism with the clock signals output by timing controller 177, during 0th to 4th segment periods, that is, while counter 156 is counting first four timing signals. Then, bit image data item "0" is supplied to 40-bit shift register 157 in synchronism with the clock signals output by timing controller 177, during 5th to 32nd segment periods, that is, while counter 156 is counting 5th to 32nd timing signals.

When pattern code 32 shown in FIG. 46 is input into ROM 176 via first line-buffer 174, bit image data item "1" is supplied to 40-bit shift register 157 in synchronism with the clock signals output by controller 177, while counter 156 is counting 1st to 4th timing signals, 9th to 12th timing signals, 17th to 20th timing signals, and 25th to 28th timing signals. Then, bit image data item "0" is supplied to 40-bit shift register 157 in synchronism with the clock signals output by timing controller 177, while counter 156 is counting 5th to 8th timing signals, 13th to 16th timing signals, 21st to 24th timing signals, and 29th to 32nd timing signals.

When counter 156 counts 32 timing signals, then the 40 bit image data items, which correspond to a second line of data supplied from second line-buffer 175 into ROM 176, are sequentially supplied to 40-bit shift register 157 in synchronism with the clock pulses output by timing controller 177.

Whenever 40 bit image data items corresponding to one line of data are supplied from ROM 176 to 40-bit shift register 157, timing controller 177 supplies a latch signal to latch 158. In response to this signal, latch 158 latches the 40 bit image data items from shift register 157.

The data processor (not shown) supplies data to D/A converter 164. This data, which represents data currents to be supplied to data-recording electrodes 30-1 to 30-40, is converted by D/A converter 164 to analog signals. These analog signals are supplied to current-to-voltage converter 166 and thus converted into voltage signals. The voltage signals are supplied, as reference voltages, to switching elements 168-1 to 168-40 of constant current switching circuits 162-1 to 162-40. In the meantime, 40 bit image data items are supplied from latch 158 to two-input AND gates 160-1 to 160-40, at the first input terminal. When the enabling signal output by timing controller 177 is supplied to these AND gates at the second input terminal, the bit image data items "1" supplied to some or all AND gates are supplied to the switching elements of the switching circuits which are coupled by these AND gates to latch 158. These switching elements are turned on, and the switching circuits having these elements are electrically connected to current-to-voltage converter 166. As a result, the reference voltage is applied from converter 166 to those of constant current circuits 170-1 to 170-40 which are included in the constant current switching circuits whose switching elements have been turned on. The constant current circuits applied with the reference voltage supply a current pulse from power-supply voltage source +V to those of data-recording electrodes 30-1 to 30-40 which are connected to the constant current circuits. The data-recording electrodes, to which the current pulses are supplied, supply data currents to ink ribbon 16, thereby recording the image data on paper 27.

What is claimed is:

1. An electrothermal printing apparatus for transferring ink onto a recording medium, thereby to record data on the recording medium, said apparatus comprising:

an ink ribbon including a base film being electrically resistive and having first and second surfaces, an electrically conductive layer formed on the first surface of the base film, and an ink layer formed on the conductive layer, and having a surface to face and contact with the recording medium;

ribbon-feeding means for feeding said ink ribbon in a first direction;

current-supplying means contacting with the second surface of the base film for supplying a signal current to the electrically conductive layer through the base film, thereby to generate heat in the base film, said heat being transferred to the ink layer through the electrically conductive layer, thereby to transfer ink to the recording medium from the ink layer; and current-collecting means located upstream of said first direction with respect to said current-supplying means, and contacting with the second surface of the base film, for collecting the signal current supplied from said current-supplying means to the electrically conductive layer.

2. The apparatus according to claim 1, further comprising carriage means for carrying said ribbon-feeding means and said current-supplying means in a second direction substantially opposite to said first direction.

3. The apparatus according to claim 2, wherein said ribbon-feeding means feeds said ink ribbon relative to said current-supplying means at a predetermined speed, and said carriage means carries said ribbon-feeding means relative to said recording medium at a predetermined speed which is not larger than the speed at which said ink ribbon is fed by said ribbon-feeding means.

4. The apparatus according to claim 1, further comprising recording medium-feeding means for feeding the recording medium in a direction at right angles to said first direction.

5. The apparatus according to claim 1, wherein said current-supplying means includes a plurality of electrodes arranged in a direction at right angles to said first direction.

6. The apparatus according to claim 5, wherein said current-supplying means includes means for supplying signal currents to said electrodes.

7. The apparatus according to claim 6, wherein said current-supplying means includes means for being capable of supplying two signal currents of different phases to two groups of electrodes, respectively.

8. The apparatus according to claim 7, wherein said electrodes are divided into two groups, and the electrodes of said first group are odd-numbered electrodes, and the electrodes of said second group are even-numbered electrodes.

9. The apparatus according to claim 7, wherein said current-supplying means includes means for determining, from pixel data, supply timings on a period of current signals and duration times of the current signals to be supplied to the electrodes, respectively.

10. The apparatus according to claim 9, wherein said pixel data represents a specified pixel and pixels surrounding the specified pixel, and is processed so as to determine the supply timings in a period of current signals and duration of the current signals to be supplied to the electrode corresponding to said specified pixel.

11. The apparatus according to claim 6, wherein said ink ribbon-feeding means feeds said ink ribbon in said first direction or in said second direction.

12. The apparatus according to claim 11, wherein said current-collecting means includes first and second electrodes which are connected to the ground, said first electrode contacting the base film when said ink ribbon is fed in said first direction, and said second electrode contacting the base film when said ink ribbon is fed in said second direction.

13. The apparatus according to claim 1, wherein said current-collecting means includes at least one electrode connected to the ground and defining a path in which said ink ribbon is fed.

14. The apparatus according to claim 1, further comprising ribbon-cooling means located upstream of said first direction with respect to said current-supplying means, for taking, from said ink ribbon, the heat generated in said ink ribbon.

15. The apparatus according to claim 14, wherein said ribbon-cooling means includes a member made of material having high thermal conductivity and contacting said ink ribbon.

16. The apparatus according to claim 14, wherein said ribbon-cooling means defines a path in which said ink ribbon is fed.

17. The apparatus according to claim 14, wherein said ribbon-cooling means includes a mechanism for cooling said ink ribbon.

18. The apparatus according to claim 17, wherein said cooling mechanism includes a fan for supplying air to said ink ribbon.

19. A resistance thermal recording apparatus for transferring ink onto a recording medium, thereby to record data on the recording medium, said apparatus comprising:

an ink ribbon including a substrate and an ink layer formed on the substrate, having a surface to face and contact the recording medium, and being able to be transferred onto the recording medium when heated;

first ribbon-feeding means for feeding said ink ribbon in a first path in a first direction;

a resistive ribbon including a base film being electrically resistive and having two opposing surfaces, and an electrically conductive layer formed on one of the surfaces of said base film and having a surface to contact with said ink ribbon;

a second ribbon-feeding means for feeding said resistive ribbon in a second path, a part of which is identical to said first path, and for holding said resistive ribbon in contact with said ink ribbon in said part of the second path;

current-supplying means contacting the base film in said part of the second path for supplying a signal current to the conductive layer through the base film, thereby to generate heat in the base film, said heat being transferred to the ink layer through the electrically conductive layer, thereby to transfer ink to the recording medium; and current-collecting means located upstream of said second path with respect to said current-supplying means, and contacting with the second surface of the base film, for collecting the signal current supplied from said current-supplying means to the conductive layer.

20. The apparatus according to claim 19, further comprising guide means for guiding said second ribbon-feeding means and said current-supplying means in a second direction substantially opposite to said first direction.

21. The apparatus according to claim 20, wherein said second ribbon-feeding means feeds said resistive ribbon relative to said current-supplying means at a predetermined speed, and said guide means guides said second ribbon-feeding mean relative to said recording medium at a predetermined speed which is not larger than the speed at which said resistive ribbon is fed by said second ribbon-feeding means.

22. The apparatus according to claim 19, further comprising recording medium-feeding means for feeding the recording medium in a direction at right angles to said first direction.

23. The apparatus according to claim 22, wherein said first ribbon-feeding means feeds said ink ribbon in the direction in which said recording medium is fed by said recording medium-feeding means.

24. The apparatus according to claim 19, wherein said current-supplying means includes a plurality of electrodes arranged in a direction at right angles to said second path.

25. The apparatus according to claim 24 wherein said current-supplying means includes means for supplying signal currents to said electrodes.

26. The apparatus according to claim 25, wherein said current-supplying means includes means for being capable of supplying two signal currents of different phases to the two groups of electrodes, respectively.

27. The apparatus according to claim 26, wherein said electrodes are divided into two groups, and the electrodes of said first group are odd-numbered electrodes, and the electrodes of said second group are even-numbered electrodes.

28. The apparatus according to claim 26, wherein said current-supplying means includes means for determining, from pixel data, supply timings in a period of current signals and duration times of current signals to be supplied to the electrode, respectively.

29. The apparatus according to claim 28, wherein said pixel data represents a specified pixel and pixels surrounding the specified pixel, and is processed so as to determine supply timings in a period of current signals and duration times of the current signals to be supplied to the electrode corresponding to said specified pixel.

30. The apparatus according to claim 24, wherein said ink ribbon-feeding means feeds said ink ribbon in said first direction or in said second direction.

31. The apparatus according to claim 30, wherein said current-collecting means includes first and second electrodes which are connected to the ground, said first electrode contacting the base film when said ink ribbon is fed in said first direction, and said second electrode contacting the base film when said ink ribbon is fed in said second direction.

32. The apparatus according to claim 19, wherein said second ribbon-feeding means feeds a loop of resistive ribbon.

33. The apparatus according to claim 19, wherein said current-collecting means includes at least one electrode connected to the ground and defining said second path in which said resistive ribbon is fed.

34. The apparatus according to claim 19, further comprising ribbon-cooling means located upstream of said first direction with respect to said current-supplying means, for taking, from said conductive ribbon, the heat generated in said resistive ribbon.

35. The apparatus according to claim 34, wherein said ribbon-cooling means includes a member made of material having high thermal conductivity and contacting said resistive ribbon.

36. The apparatus according to claim 34, wherein said ribbon-cooling means defines a path in which said resistive ribbon is fed.

37. The apparatus according to claim 34, wherein said ribbon-cooling means includes a mechanism for cooling said resistive ribbon.

38. An electrothermal printing apparatus comprising:

an ink ribbon having first layer being electrically resistive, second layer formed on said first layer being electrically non-resistive, and an ink layer formed on said second layer;

supplying means having first contact portion with the first layer of said ink ribbon, for supplying current through first contact portion to said first layer, thereby removing an ink from the ink layer and printing the ink to a recording medium; and collecting means having second contact portion with the first layer of said ink ribbon, for collecting current being supplied by said supplying means through the second contact portion;

said supplying means and collecting means being located such that no ink removed area of the ink layer is arranged between the first contact portion and second contact portion.

39. An electrothermal printing apparatus for transferring ink onto a recording medium, thereby to record data on the recording medium, said apparatus comprising:

an ink ribbon including a base film being electrically resistive and having first and second surfaces, an electrically conductive layer formed on the first surface of the base film, and an ink layer formed on the conductive layer, and having a surface to face and contact with the recording medium;

ribbon-feeding means for feeding said ink ribbon in a first direction;

current-supplying means contacting with the second surface of the base film for supplying a signal current to the electrically conductive layer through the base film, thereby to generate heat in the base film, said heat being transferred to the ink layer through the electrically conductive layer, thereby to transfer ink to the recording medium from the ink layer;

current-collecting means located upstream of said first direction with respect to said current-supplying means, and contacting with the second surface of the base film, for collecting the signal current supplied from said current-supplying means to the electrically conductive layer; and ribbon-cooling means located upstream of said first direction with respect to said current-supplying means, for taking, from said ink ribbon, the heat generated in said ink ribbon.

40. A resistance thermal recording apparatus for transferring ink onto a recording medium, thereby to record data on the recording medium, said apparatus comprising:

an ink ribbon including a substrate and an ink layer formed on the substrate, having a surface to face and contact the recording medium, and being able to be transferred onto the recording medium when heated;

first ribbon-feeding means for feeding said ink ribbon in a first path in a first direction;

a resistive ribbon including a base film being electrically resistive and having two opposing surfaces, and an electrically conductive layer formed on one of the surfaces of said base film and having a surface to contact with said ink ribbon;

a second ribbon-feeding means for feeding said resistive ribbon in a second path, a part of which is identical to said first path, and for holding said resistive ribbon in contact with said ink ribbon in said part of the second path;

current-supplying ;means contacting the base film in said part of the second path for supplying a signal current to the conductive layer through the base film, thereby to generate heat in the base film, said heat being transferred to the ink layer through the electrically conductive layer, thereby to transfer ink to the recording medium;

current-collecting means located upstream of said second path with respect to said current-supplying means, and contacting with the second surface of the base film, for collecting the signal current supplied from said current-supplying means to the conductive layer; and ribbon-cooling means located upstream of said first direction with respect to said current-supplying means, for taking, from said conductive ribbon, the heat generated in said resistive ribbon.

41. The apparatus according to claim 5, wherein said current-supplying means includes means for generating constant currents to supply the constant current to the electrodes.

42. The apparatus according to claim 24, wherein said current-supplying means includes means for generating constant currents to supply the constant current to the electrodes.

* * * * *